(12) United States Patent
Mihalakis

(10) Patent No.: US 6,375,330 B1
(45) Date of Patent: Apr. 23, 2002

(54) REFLECTIVE LIQUID-CRYSTAL-ON-SILICON PROJECTION ENGINE ARCHITECTURE

(75) Inventor: George M. Mihalakis, Milpitas, CA (US)

(73) Assignee: Gain Micro-Optics, Inc., San Jose, CA (US)

( * ) Notice: Subject to any disclaimer, the term of this patent is extended or adjusted under 35 U.S.C. 154(b) by 0 days.

(21) Appl. No.: 09/474,943

(22) Filed: Dec. 30, 1999

(51) Int. Cl.[7] ............ G03B 21/00; G03B 21/28; G03B 21/14
(52) U.S. Cl. ............ 353/31; 353/33; 353/81; 353/84
(58) Field of Search ............ 353/20, 30, 31, 353/33, 34, 37, 47, 74, 81, 82, 84; 349/5, 7, 9

(56) References Cited

U.S. PATENT DOCUMENTS

| | | | |
|---|---|---|---|
| 4,739,396 A | 4/1988 | Hyatt | 358/60 |
| 4,796,978 A | 1/1989 | Tanaka et al. | 350/337 |
| 4,864,390 A | 9/1989 | McKechnie et al. | 358/60 |
| 4,935,656 A | 6/1990 | Kawamura | 310/156 |
| 4,962,997 A | 10/1990 | Baldwin | 350/172 |
| 4,983,032 A | 1/1991 | Van Den Brandt | 353/30 |
| 4,989,076 A | 1/1991 | Owada et al. | 358/61 |
| 5,012,274 A | 4/1991 | Dolgoff | 340/702 |
| 5,022,750 A | 6/1991 | Flasck | 353/31 |
| 5,024,524 A | 6/1991 | Flasck | 353/31 |
| 5,028,121 A | 7/1991 | Baur et al. | 350/351 R |
| 5,042,929 A | 8/1991 | Tanaka et al. | 359/708 |
| 5,060,058 A | 10/1991 | Goldenberg et al. | 358/60 |
| 5,075,798 A | 12/1991 | Sonehara et al. | 359/490 |
| 5,097,323 A | 3/1992 | Sato et al. | 358/60 |
| 5,098,183 A | 3/1992 | Sonehara et al. | 353/31 |
| 5,105,265 A | 4/1992 | Sato et al. | 358/60 |
| 5,108,172 A | 4/1992 | Flasck | 353/31 |
| 5,115,305 A | 5/1992 | Bauer et al. | 358/60 |
| 5,181,054 A | 1/1993 | Nicolas et al. | 353/20 |
| 5,231,431 A | 7/1993 | Yano et al. | 353/31 |
| 5,239,322 A | 8/1993 | Takanashi et al. | 353/31 |
| 5,245,449 A | 9/1993 | Ooi et al. | 359/40 |
| 5,321,448 A | 6/1994 | Ogawa | 353/34 |
| 5,327,270 A | 7/1994 | Miyatake | 359/63 |
| 5,386,306 A | 1/1995 | Ginjina et al. | 359/52 |
| 5,390,048 A | 2/1995 | Miyatake et al. | 359/650 |
| 5,400,180 A | 3/1995 | Chung | 359/634 |
| 5,420,655 A | 5/1995 | Shimizu | 353/33 |
| 5,459,539 A | 10/1995 | Yamamoto | 353/119 |

(List continued on next page.)

FOREIGN PATENT DOCUMENTS

EP    0710 036 A2    5/1996

OTHER PUBLICATIONS

International Search Report.

Primary Examiner—Russell Adams
Assistant Examiner—Rodney Fuller
(74) Attorney, Agent, or Firm—Lyon & Lyon LLP

(57) ABSTRACT

A projection engine architecture for use with liquid-crystal-on-silicon semiconductor imager devices is described. The optical architecture disclosed includes a high speed light collection stage wherein luminance from an arc lamp is collected and condensed, an illumination stage wherein the luminance is ideally transformed for presentation to an imaging stage comprised of a triad of three perpendicular polarization beamsplitter cubes and attendant color processing components that form a solid prism assembly. Central to the architecture are an arrangement of optical components that eliminate the deleterious effects of waste light created by polarization and color separation components within the imaging stage.

26 Claims, 11 Drawing Sheets

U.S. PATENT DOCUMENTS

| | | | |
|---|---|---|---|
| 5,467,146 A | | 11/1995 | Huang et al. ................ 348/743 |
| 5,486,881 A | | 1/1996 | Huang ......................... 353/34 |
| 5,577,826 A | | 11/1996 | Kasama et al. ............... 353/31 |
| 5,748,376 A | * | 5/1998 | Lin et al. ..................... 359/629 |
| 5,777,789 A | | 7/1998 | Chiu et al. ................... 359/494 |
| 5,798,819 A | | 8/1998 | Hattori et al. ................ 353/33 |
| 5,815,221 A | | 9/1998 | Kojima et al. ............... 348/751 |
| 5,829,855 A | * | 11/1998 | Uchiyama .................... 353/74 |
| 5,835,661 A | * | 11/1998 | Tai et al. ..................... 385/146 |
| 6,034,818 A | | 3/2000 | Sedlmayr .................... 359/497 |
| 6,046,858 A | | 4/2000 | Scott et al. .................. 359/634 |
| 6,053,615 A | * | 4/2000 | Peterson et al. ............. 353/20 |
| 6,082,861 A | * | 7/2000 | Dove et al. ................... 353/20 |
| 6,139,156 A | | 10/2000 | Okamori et al. ............. 353/98 |
| 6,174,060 B1 | * | 1/2001 | Imaoka et al. ............... 353/31 |
| 6,176,586 B1 | * | 1/2001 | Hirose et al. ................ 353/31 |
| 6,183,090 B1 | * | 2/2001 | Nakanishi et al. ........... 353/20 |
| 6,183,091 B1 | * | 2/2001 | Johnson et al. .............. 353/20 |

* cited by examiner

REFLECTIVE LIQUID-CRYSTAL-ON-SILICON PROJECTION ENGINE ARCHITECTURE

FIELD OF THE INVENTION

The present invention relates generally to rear-projection television (RPTV) systems, computer monitor and portable data display systems, and more particularly to electronic image projector engines. More particularly, the present invention relates to projection engines which enable the use of reflective liquid-crystal-on-silicon semiconductor light valve imaging devices, commonly referred to as 'liquid-crystal-on-silicon imagers.'

BACKGROUND OF THE INVENTION

Until recently, demand for electronic image projectors has been limited to business and professional environments where the high cost and complexity of prior art image projection systems is a lesser limiting factor in their applicability. The large number of optical components, the requirement to maintain accurate positioning in the projector engine assembly during use, and the high cost of prior art electro-optic 'imager' devices (e.g., TFT-LCD, DMD, ILA, etc.) limits the marketability of products using such prior art technologies. Moreover, prior art projection engines inefficiently use the optical information provided by the imager.

Recently, image content with dramatically higher resolutions has emerged in the consumer television and computer display environments, bringing higher demand for projected image systems. However, prior art projected image systems cannot display these high-resolution images with a price that consumers are willing to pay. Moreover, prior art projected image systems do even not provide performance levels that justify their high cost. Thus, there is a need to reduce the complexity and cost of projected image system technology while improving manufacturability, reliability, image quality, system lifetime, heat production, color purity, lamp efficiency and contamination resistance.

The need for large, high resolution display devices is becoming more important because the United States and other countries are in the process of shifting from an analog, low resolution television delivery system, to a digital, high resolution delivery system, sometimes referred to as "high-definition television", or "HDTV". There is also a need for larger and higher-resolution computer monitors. In terms of resolution, the current television delivery system in North America, known as NTSC (this format was developed by the National Television Standards Committee-hence the format has been named NTSC) has addressable resolution of approximately 425 by 565 pixels. Pixel density is most common method of expressing the resolution of a display device. A 'pixel' is the basic 'picture element' of an image (sometimes referred to as 'pels'). The term pixel usually applies to the quantification of electronic images, which are composed of an array of pixels that each define a tiny portion of the image. This array of image picture elements is usually specified by a vertical number and a horizontal number, the product of which is the total number of pixels. Thus, the NTSC picture can provide, at best, approximately 240,125 total pixels.

For bandwidth conservation reasons, the typical cable television signal fed to most U.S. households arrives with even less resolution, approximately 350 by 466 pixels (163,100 total pixels). While there are as many as eighteen different formats proposed for digital television, there are three different resolutions likely to be established as final standards and used by terrestrial broadcast, direct broadcast satellite and cable companies. These formats are base digital television, 480 by 640 pixels (307,200 total pixels), low HDTV, 720×1280 pixels (921,600 total pixels), and high (or full) HDTV, 1080 by 1920 pixels (2,073,600 total pixels). Thus, it is seen that a television capable of displaying full HDTV resolution must have the ability to display nearly nine times as much picture information (i.e., nearly nine times as many pixels) as current NTSC broadcasts require. Moreover, even lower resolution digital television formats greatly exceed the cost-per-pixel capabilities of the projection-CRT.

Prior art projection image technologies are not capable of efficiently displaying full HDTV resolution at low cost. By far the most popular large screen television system is the rear projection television, known as RPTV. A typical RPTV uses three cathode ray tubes that project picture data onto the rear of a transmission screen. The screen then distributes the picture data into an image viewing field, within which the viewer can see it. Demand for inexpensive televisions and computer monitors having large image sizes and high resolution has prompted leading semiconductor manufacturers to develop reflective liquid-crystal-on-silicon semiconductor imaging device components. This electro-optic component, often referred to as an 'imager,' is essentially an electronic device constructed to operate as a reflective light valve. The reflective liquid-crystal-on-silicon light valve is comprised of a semiconductor integrated circuit on a single piece of silicon, similar to a DRAM or other such electronic memory device. Its surface contains the electronic image elements, i.e. its pixels, in regular array within its active area. The integrated circuit is transformed into an electro-optic device through established methods by plating its surface with a reflective mirror metal or suitable dielectric thin-film stack such that light incident upon it is reflected at high efficiency amidst the electric fields created at the surface of the device. Using methods well known in the liquid crystal display trade, a twisted-nematic (TN) or other such liquid crystal cell is bonded atop the surface of the silicon die in close proximity. When this combination is illuminated with polarized light, the resulting construction acts in effect as a reflective light polarization modulator wherein each picture element on the surface of the integrated circuit can be separately controlled electronically.

Reflective liquid-crystal-on-silicon light valve component devices are now readily available from a number of manufacturers. Their development has been driven by the simple fact that they are less expensive to manufacture in high volumes than thin-film transistor (TFT) or digital-micro-mirror (DMD) imager components used in the architectures of established solid-state projection engines. They are also capable of much higher market applicability since their manufacture does not require customized equipment, unlike TFT and DMD imagers, which have experienced only narrow demand in business and professional environments. Instead, reflective liquid-crystal-on-silicon imager devices are manufactured on existing 'memory chip' process lines.

For reflective liquid-crystal-on-silicon light valve imagers to be useful in televisions and computer monitors having larger viewing area and higher resolution, a projection engine optical architecture having high performance and low cost is necessary. An image 'projection engine' is a term used in the trade to denote the essential assembly within a projection system, usually taken to mean all components from the lamp to the projection lens. None of the prior art projection engine optical architectures can provide either high performance or low cost when using liquid-crystal-onsilicon light valve imagers. The various embodiments of the present invention show television or computer monitor using an engine architecture capable of significantly higher resolution than the resolution limits of projection cathode ray tube technology at cost demands of the consumer user.

The transformation of light collected from a bright lamp into image luminance on a screen is a fundamental purpose of image projection engines. The lamp used in an RPTV or monitor is typically an arc lamp, which emits white light in all directions. Geometrically organizing and redirecting this randomly directed white light into uniformly directional and focused light, thereby creating an image, is the purpose of a projector engine.

Light collection in optics is quantified by either f/# or numerical aperture, yet both quantities describe the angular extent of a particular cone of light and are directly related. The f/# describes the angular extent of a light cone by the ratio of the length of the cone to its diameter:

$$f/\# = \text{focal length/diameter}$$

whereas numerical aperture, N.A., directly describes the angle of the cone of light within which all light is contained:

$$N.A. = n * \sin \theta$$

where n is the index of refraction of the optical medium within which the cone resides, and θ is the angle created by the margins of the contained light cone and the optical axis. Numerical aperture can be easily converted to f/# by the relation:

$$f/\# = 1/(2*N.A.)$$

In the collection stage of the projection engine, numerical aperture and f/# quantify the geometrical directionality advantage the reflector can produce over the random directionality natural to the lamp's emission. The absolute values (i.e., the numerical value) of numerical aperture and f/# are essentially inversely proportional to one another, yet both describe the same geometric containment within a light cone. Large N.A. corresponds to large cone angle, and large f/# corresponds to small cone angle.

Light from the lamp is emitted in all directions, so its collection by a reflector or lens or other such collection means transforms this emission from a maximum solid angle directionality of 4π steradians into a cone of specific numerical aperture. This is referred to as the "collection stage" of the optical architecture and is critical to engine performance since the projection engine can only use light contained within this collected numerical aperture. Any light that is lost (i.e., not collected), results in lost image brightness. Subsequent to the collection stage is the "illumination stage," where the cone of light from the collection stage is transformed to a yet narrower and more practical cone of light, which is then focused to illuminate the reflective liquid-crystal-on-silicon imager residing in an "imaging stage." It is within the imaging stage where the light is spectrally separated, modulated, and spectrally combined upon exit of the imaging stage through the projection lens and out to the screen.

A key aspect of the invention is an improvement in the performance of the polarization components within the imaging stage, including the reflective liquid-crystal-on-silicon imager, attained when the cone of light focused onto the active area of the imager be of a special angular order specified in optics as a 'telecentric' focus. A telecentric focus is one where each point at the focus on the area of the imager is comprised of identical angular bundles that are centered symmetrically about the perpendicular axis. The purpose of presenting telecentric illumination to the imaging stage is to: (1) assure that each pixel locale on the imager device is illuminated by a cone of light that is spatially identical in every way to the cone of light illuminating every other pixel locale; and to (2) assure that each locale on the hypotenuse of the polarization beamsplitter cube components within the engine are illuminated by a cone of light that is spatially identical in every way to the cone of light illuminating every other locale on the hypotenuse. This process significantly improves the polarization performance of these components across the desired spectral waveband.

A primary property of reflective liquid-crystal-on-silicon imagers is the polarization of light. The degree to which polarization is processed and transformed within the projection engine is of paramount importance to its total image performance. Polarization is commonly resolved into two opposite spatial components, "P" and "S". A vector quantity pertinent to this polarization property is the "polarization state" of a particular beam of light. The polarization states of interest are "P-polarization", which is the alignment of the polarization vector with the electric field vector of the light waves, and "S-polarization", which is the polarization vector perpendicular to the electric field vector of the light waves. As used herein, polarization logic means that a polarization vector pointing in any direction of the compass about the optical axis can be resolved into its two constituent components in the S direction or the P direction. The quality of the contrast in the engine polarization states is directly converted into luminance contrast in the image, which the viewer sees as the full black and full white states of the image. Thus, high contrast between P-polarization and S-polarization is necessary for high image quality.

Prior art projection engine architecture is not appropriate for display systems using reflective light valve imager devices. The reason for this is that liquid-crystal-on-silicon light valves have reflective geometry characteristics and polarization dependence characteristics, among others, that are significantly different than TFT transmission-LCD or reflective DMD imaging devices. Prior art engines simply do not work well with liquid-crystal-on-silicon light valves because they are trying to create an image from an electro-optic device that is significantly different in character.

All projection engine architectures must perform the following functions. The engine must collect, condense and condition raw bulb light emission for illumination of the imager devices. Then, the engine must separate the white light from the lamp into three primary colors, polarize each color appropriately for presentation to three reflective liquid-crystal-on-silicon light valve modulators. The engine must then analyze polarization of the modulated primary images after reflection from the imagers, and then combine the primary colors through a projection lens that focuses the combined image onto the screen.

Prior art engines are not ideally suited for use with reflective liquid-crystal-on-silicon light valve modulators. For example, in U.S. Pat. No. 4,983,032 to Van Den Brandt ("the Van Den Brandt '032 patent"), U.S. Pat. No. 5,028,121 to Baur et al ("the Baur '121 patent"), U.S. Pat. No. 5,577,826 to Kasama et al ("the Kasama '826 patent") describe various projection engines established for use with reflective imaging components. None of these prior art engines suggest that they can be used specifically with reflective liquid-crystal-on-silicon semiconductor devices, and each has deleterious conceptual issues and efficacy concerns specific or peculiar to them. Indeed, as mentioned above, engines designed for use with other reflective imagers such as DMD (Digital Micro-Mirror Device), PDLC (Polymer Dispersed Liquid Crystal), FMLC (Ferro-Magnetic Liquid Crystal) are not likely to be useful as an engine for a display device using a liquid-crystal-on-silicon semiconductor imager. Moreover, none of these prior art references take into account real world problems, the most important of which is the waste light created by the various optical elements they use. This will be discussed in more detail below.

Referring specifically to the Van Den Brandt '032 patent, the first limitation is the dichroic plates that separate and combine its color spectra. These dichroic plates are set at an angle relative to both incident and reflected beams passing through them. Characteristic to reflective liquid-crystal-on-silicon light valve imager is that its incident and reflected beams are of opposite polarization, allowing for it to function as a light valve modulator. The imager reflection encodes the image onto the incident beams by rotating, or "twisting" the reflected return polarization a maximum of ninety degrees. The quality of the spectral responses of the dichroic separation layers positioned at an angle to both incident and return beams is greatly reduced when the angled dichroic layers process color in separate and opposite polarization states. The result of this angular dichroic configuration is a shift of the dichroic transmission spectra between incident and reflected beams, causing irreconcilable chromatic waste light and reduction of polarization purity which contaminates the image quality, resulting in reduction of throughput efficiency, color purity and image contrast.

A second limitation to the Van Den Brandt '032 patent is that it is based on "off-axis illumination," such that light falls incident on the reflective imager from a principle angle other than zero degrees. This causes the liquid crystal reflective imager contrast and color luminance uniformity performance to be reduced with the angle of incidence. Moreover, off-axis illumination requires larger, costlier optical components along with precise mechanical positioning of the components in the assembled engine, which is also costly as well as inherently problematical.

A third limitation of the architecture disclosed in the Van Den Brandt '032 patent is its excessively long optical path length that a projector utilizing this engine must have. This longer path length from imager to projection lens adversely affects the cost and performance of the projection lens, and adversely affects the 'etendu point' of the system. Etendu, described in detail below, is a measurement of allowable angular and brightness transformations governed by fundamental thermodynamic effects.

A fourth limitation of the architecture disclosed in the Van Den Brandt '032 patent is that it requires accurate positioning of its optical components in a solid assembly structure to obtain a properly aligned image on the screen. This increases manufacturing cost and lowers long term reliability. In addition, since the components are in air, a fifth limitation in real engine embodiments of this architecture is the need to effectively seal the engine volume from particle contaminants visible in the projected image as optical surfaces collect dust and vapor contamination. Finally, the Van Den Brandt '032 patent completely ignores the waste light created by its various optical components. Failure to compensate for this waste light renders the teachings of Van Den Brandt '032 patent of little value.

Therefore while the Van Den Brandt '032 patent discloses an engine for reflective imagers, it has many disadvantages in performance, cost, efficiency and viability.

An advantage of the engine described in Kasama '826 over that described in Van Den Brandt 032 is its "retroreflective" approach. Retroreflection does offer certain advantages over an off-axis system. Retroreflection is the optical term used to describe zero degree incidence to a reflective surface such that the incident and reflected beams lie along the same path and are separated only by their opposite direction. The light path in such an instance, travels along a retroreflective axis. Reflective liquid-crystal-on-silicon imager devices are desirably illuminated at zero degrees incidence to maximize contrast and luminance uniformity performance as well as to require smaller components and more compact engine volumes. The sharing of the optical path between incident and reflected beams allows a single polarization beamsplitter cube to both polarize and analyze the sent and returned light beams, provided the design concept establishes means to remove or redeem polarization waste, which the Kasama '826 does not suggest. The failure to of the Kasama '826 patent to teach any method of removing or rejecting the color and polarization waste render its teachings of little value.

The other limitations of the engine in the Kasama '826 patent are similar to those of the Van Den Brandt '032 patent. To separate and combine primary colors, a dichroic plate is used at oblique angles to both incident and return beams possessed of opposite polarizations. This reduces throughput efficiency, color purity and contrast performance. Another similar limitation of the engine of the Kasama '826 patent is the need to accurately position optical components in air, which decreases stability and increases the likelihood of contamination. A third limitation is the long optical path, or back focal length, from imager to projection lens, reducing projection lens performance as well as mandating less efficient collimated incident light.

A fourth limitation of the Kasama '826 patent is the inability of the design to deliver pure polarization states between incident and retroreflected beams. Since the beam reflected from each imager is rotated a maximum of ninety degrees in polarization state relative to the incident beam, each optical component in the architecture operates in both polarizations. This renders it impossible to insert subsequent polarization components to trim or 'clean' either state without adversely affecting the other polarization state. This results in a reduction of contrast performance. Due to the physics of polarization beamsplitter cubes, the single polarization beamsplitter cube shown in the design does not produce high quality polarization equally in both P and S states. The quality of the contrast in the engine polarization states is directly converted into luminance contrast in the image, which the viewer sees as the full black and full white states of the image.

Finally, neither the Kasama '826 patent nor the Van Den Brandt '032 patent can be effectively manufactured to operate at high "collection speed." Collection speed refers to optical systems that do not attempt to collimate light from the lamp into small angles, but rather condenses it into a large angle range of distinct focus and numerical aperture. Collection speed is profoundly related to the throughput efficiency of the projection engine. The reason for this is that, at higher speed, light from the lamp can be collected and transferred through the engine at higher efficiency. Efficiency is improved in high-speed systems because the engine can operate closer to its 'etendu point'. Etendu is the optical term used to describe the maximum allowable light that can be geometrically directed from the lamp onto the imager and will be discussed in more detail below.

An advantage of the Baur '121 patent over the other described patents is its solid, cemented prism assembly with reflective imager devices attached. This removes the need for an accurate mechanical structure in the engine assembly to secure its components during operation and seals the critical optical surfaces against contamination. The permanently attached imagers bonded onto a solid prism subassembly require alignment and positioning only a single time during its manufacture and not in the engine product itself. This frees the architecture from requiring positioning and sealing apparatus and hardware in its embodiments.

However, the projection system disclosed the Baur '121 patent and other similar prior art systems have limitations in performance and viability. A first limitation of the architecture disclosed in the Baur '121 patent is the reliance of dichroic color separation and combining layers situated at steep angles to both incident and reflected beams of opposite polarization. In fact, this condition is worsened in the Baur '121 patent's architecture because these dichroic layers are immersed in glass at 45°, further widening the spectral disparity in their response when compared to the same dichroic surface in air. Baur discloses an "X-cube" configuration where two dichroic planar layers of differing spectra intersect in an 'X' shape within a glass cube. This component is commonly found in projectors with transmissive TFT imagers, where color separation and combining functions are isolated and not subjected to beams of opposite polarizations. However, their use for reflective liquid-crystal-on-silicon imagers, which characteristically prefer separation and combining functions in a single set of color components operating in retroreflection, requires that the immersed dichroic layers operate in both polarizations. This process, especially in the immersed dichroic embodiment disclosed in the Baur '121 patent, produces high levels of undesirable waste light, which, as discussed, reduces throughput, image contrast and produces color leakage (i.e., mixing) between the primary colors. It is for this reason that the architecture of the Baur '121 patent requires nearly collimated light rather than illuminating the architecture at higher optical speed, where the deleterious effects of immersed angular dichroic layers are exacerbated.

A second limitation of the Baur '121 patent's architecture is the fact that it requires either the use of six reflective imagers rather than three, or else a fifty percent sacrifice in engine light throughput efficiency. Both of these requirements are insufficient to achieve satisfactory basic or further functionality requirements. For example, the six reflective imagers mandated by the design to account for what would otherwise be a loss of half the usable light, is arranged with two reflective imagers per primary color channel rather than simply one. This not only doubles the cost of the electro-optic components in the engine, but also adds additional manufacturing complexity. Converging six active pixel areas during manufacture is considerably more elaborate than aligning only three active pixel areas.

A third limitation of the Baur '121 patent's architecture relates to its fundamental structure, which mandates a single polarization component, a polarization beamsplitter cube. Since beams of both polarizations share the retroreflective paths, polarization trim or clean up components cannot be used to improve the design's limiting polarization contrast. This places an unrealistically high demand on the quality of the polarization in both states attainable from real polarization beamsplitter components in white light and especially at higher optical speeds. Thus, the Baur '121 patent's architecture cannot produce acceptable basic functionality as well as any advances in further functionality.

Thus, there is a need for a low cost, high performance, optical engine for use in rear projection television and computer monitor applications having improved performance and lower cost than those of the prior art.

SUMMARY OF THE INVENTION

A new type of projection engine architecture for use in projection television, computer monitor or data displays of either front or rear projection is disclosed.

In a first aspect of the present invention, a method for creating an image in a projected image device comprising the steps of providing a first polarization telecentric white light beam, splitting the first polarization telecentric white light beam into a first polarization telecentric green light beam and a first polarization telecentric magenta light beam. The first polarization telecentric green light beam is directed onto a first liquid-crystal-on-silicon semiconductor light valve imaging device such that the first liquid-crystal-on-silicon semiconductor light valve imaging device reflects a second polarization green light beam containing pixel data. The second polarization green light beam containing pixel data is switched into a first polarization green light beam containing pixel data. The first polarization green light beam containing pixel data is directed along an output axis while substantially all green waste polarization light is directed along an axis separate from the output axis. The first polarization red component of the first polarization telecentric magenta light beam is switched into a second polarization red light beam. The second polarization red light beam is directed onto a second liquid-crystal-on-silicon semiconductor light valve imaging device such that the second liquid-crystal-on-silicon semiconductor light valve imaging device reflects a first polarization red light beam containing pixel data. The first polarization red light beam containing pixel data is directed along an output axis while substantially all red waste polarization light is directed along an axis separate from the output axis. The first polarization red light beam containing pixel data is switched into a second polarization red light beam containing pixel data. The first polarization blue component of the magenta beam is directed onto a third liquid-crystal-on-silicon semiconductor light valve imaging device such that the third liquid-crystal-on-silicon semiconductor light valve imaging device reflects a second polarization blue light beam containing pixel data. The second polarization blue light beam containing pixel data is directed along an output axis while substantially all blue waste polarization light is directed along an axis separate from the output axis.

In another aspect of the present invention, the first polarization state is S-polarization while the second polarization state is P-polarization.

In another aspect of the present invention, an imaging structure for use in a projected imaging device is disclosed that comprises a color separation component that splits a first polarization white light beam into a first polarization green light beam and a first polarization magenta light beam. In preferred embodiments, the color separation component is dichroic mirror. The imaging structure also comprises a first polarizing beamsplitter cube positioned to receive the first polarization green light beam, a second polarizing beamsplitter cube positioned to receive the first polarization magenta light beam, and a third polarizing beamsplitter cube. The imaging structure of this aspect of the present invention also comprises a first liquid-crystal-on-silicon semiconductor light valve imaging device affixed to a first face of the first polarizing beamsplitter cube. A second liquid-crystal-on-silicon semiconductor light valve imaging device is affixed to a first face of the second polarizing beamsplitter cube. A third liquid-crystal-on-silicon semiconductor light valve imaging device affixed to a second face of the second polarizing beamsplitter cube. A first retarder is affixed to a second face of the first polarizing beamsplitter cube and a first face of the third polarizing beamsplitter cube. A second retarder is affixed to a third face of the second polarizing beamsplitter cube. The imaging structure also comprises a third retarder that is affixed to a fourth face of the second polarizing beamsplitter cube and a second face of the third polarizing beamsplitter cube.

In another aspect of the present invention, an imaging structure is disclosed which comprises a color separation component that splits a first polarization white light beam into a first polarization green light beam and a first polarization magenta light beam. A first polarizing beamsplitter cube is positioned to receive the first polarization green light beam. A first liquid-crystal-on-silicon semiconductor light valve imaging device affixed to a first face of the first polarizing beamsplitter cube. A first retarder is affixed to a second face of the first polarizing beamsplitter cube that is adapted to switch polarization state of green light. A second polarizing beamsplitter cube is positioned to receive the first polarization magenta light beam. A second retarder is affixed to a first face of the second polarizing beamsplitter cube which is adapted to switch polarization state of red light. A second liquid-crystal-on-silicon semiconductor light valve imaging device affixed to a second face of the second polarizing beamsplitter cube. A third liquid-crystal-on-silicon semiconductor light valve imaging device is affixed to a third face of the second polarizing beamsplitter cube. A third retarder is affixed to a fourth face of the second polarizing beamsplitter cube that is adapted to switch polarization state of red light. A third second polarizing beamsplitter cube is positioned such that a first face thereof is affixed to the first retarder and a second face thereof is affixed to the third retarder.

In another aspect of the present invention, an inventive compander for use in an electronic image projector engine that uses reflective imaging devices having a specified aspect ratio and specified surface area. The compander is adapted to receive a light beam having an illumination structure. The compander smoothes the illumination structure, de-circularizes the light beam, sets engine etendu point, transforms numerical aperture of the light beam to a predetermined numerical aperture, magnifies the light beam to create a light beam aperture having the specified aspect ratio and the specified surface area, and renders the light beam telecentric. The compander comprises an elongate member comprised of an optical material, and has an entrance face and an exit face. The exit face is oppositely opposed from the entrance face. The entrance face has a quadrilateral shape with a first aspect ratio and a first surface area. The exit face having a quadrilateral shape with a second aspect ratio and second surface area. The second surface area being greater than the first predetermined surface area. In an aspect of the present invention, the compander is such that the first aspect ratio and the second aspect ratio are substantially identical. In an aspect of the present invention, the compander is such that the second aspect ratio is substantially identical to the specified aspect ratio. In an aspect of the present invention, the compander is such that the optical material is glass. In an aspect of the present invention, the compander is such that the optical material is plastic. In an aspect of the present invention, the compander is an integral, one piece structure.

In another aspect of the present invention, an engine architecture for a projection device is disclosed that comprises a collection stage, an illumination stage and an imaging stage. In another aspect of the invention, an engine comprising a light source a reflector that collects and condenses light emitted by the light source into a first focus of light, and a mirror that redirects the first focus of light is disclosed. A compander positioned to receive the first focus of light that comprises an elongate member having an entrance face and an exit face oppositely opposed from the entrance face. The entrance face comprises a quadrilateral having a first aspect ratio while the exit face comprises a quadrilateral having a second aspect ratio. This compander outputs a telecentric light beam. A first polarizing beamsplitter cube for receipt of the telecentric light beam is oriented such that it outputs a telecentric light beam having a first polarization. A condenser receives the telecentric light beam having the first polarization state from the first polarizing beamsplitter cube and focuses this light beam along a first optical axis.

A dichroic mirror is disposed at a substantially forty-five degree angle with respect to the first optical axis that is adapted to split the light beam into a green light beam substantially along a second optical axis and a magenta light beam substantially along the first optical axis. The magenta beam has a red component and a blue component.

A prism assembly comprising a first dichroic trimming mirror is positioned substantially perpendicular to the second optical axis. A second polarization beamsplitter cube comprising a first beam splitting hypotenuse reflects the first polarization green light along a third optical axis and transmits second polarization green light along the second optical axis. A first reflective liquid-crystal-on-silicon semiconductor light valve imaging device is affixed to the second polarization beamsplitter cube and is substantially perpendicular to the third optical axis. The first reflective liquid-crystal-on-silicon semiconductor light valve imaging device reflects green light towards the first beam splitting hypotenuse along the third optical axis. The first beam splitting hypotenuse reflects the first polarization green light along the second optical axis and transmits second polarization green light along the first optical axis.

A first half-wave retarder is affixed to the second polarization beamsplitter cube and is substantially perpendicular to the third optical axis. A second dichroic trimming mirror is arranged substantially perpendicularly to the second optical axis. A second half-wave retarder is affixed to the second dichroic mirror and is substantially perpendicular to the first optical axis. The second half-wave retarder switches first polarization red light to the second polarization.

A third polarization beamsplitter cube comprising a second beam splitting hypotenuse which reflects first polarization light along a fourth optical axis and transmits second polarization light along the second optical axis. A second reflective liquid-crystal-on-silicon semiconductor light valve imaging device is affixed to the third polarization beamsplitter cube and being substantially perpendicular to the first optical axis. The second reflective liquid-crystal-on-silicon semiconductor light valve imaging device reflects red light towards the second beam splitting hypotenuse along the first optical axis. The second beam splitting hypotenuse reflects first polarization red light along the fourth optical axis and transmits second polarization red light along the first optical axis.

A third reflective liquid-crystal-on-silicon semiconductor light valve imaging device is affixed to the third polarization beamsplitter cube and is substantially perpendicular to the fourth optical axis. The third reflective liquid-crystal-on-silicon semiconductor light valve imaging device reflects blue light back towards the second beam splitting hypotenuse along the fourth optical axis. The second beam splitting hypotenuse reflects first polarization blue light along the first optical axis and transmits second polarization blue light along the fourth optical axis.

A third half-wave retarder is affixed to the third polarization beamsplitter cube and is substantially perpendicular to the fourth optical axis. The third half-wave retarder switching the first polarization red light to the second polarization. A fourth polarization beamsplitter cube is affixed to the first half-wave retarder and the third half-wave retarder such that the third optical axis is substantially perpendicular to the fourth optical axis. The fourth polarization beam splitter cube comprises a third beam splitting hypotenuse which reflects first polarization light along the third optical axis and transmits second polarization light along the fourth optical axis.

In another aspect of the present invention, the image projection engine apparatus is such that light beams having the first polarization are in an S-polarization state and light beams having the second polarization are in a P-polarization state.

In another aspect of the present invention, the image projection engine apparatus is such that first aspect ratio and the second aspect ratio are the same. In another aspect of the present invention, the image projection engine apparatus is such that the entrance face has smaller surface area than the exit face. In another aspect of the present invention, the image projection engine apparatus is such that the first imaging device, the second imaging device and the third imaging device are quadrilateral in shape and have a third aspect ratio. In another aspect of the present invention, the image projection engine apparatus is such that the third aspect ratio is equal to the second aspect ratio. In another aspect of the present invention, the image projection engine apparatus also includes a projection lens aligned along the fourth optical axis. In yet another aspect of the present invention, a rear projection television or computer monitor utilizing the engine is disclosed.

The construction and arrangement of the fundamental projection engine architecture according to the present invention provides many advantages over the prior art. One exemplary advantage is better image performance for liquid-crystal-on-silicon projection engines in all attributes of basic functionality. Luminous efficiency, contrast, luminance output, color uniformity and resolution are superior to existing architectures utilized in competing projector technologies of like classification. Another advantage provided are remedies for specific physical loss mechanisms unique to reflective liquid-crystal-on-silicon imaging. Another advantage of the present invention is substantially reduced costs, complexity and component count to embody or manufacture a quality engine design based on the architecture. Another advantage is high projected image performance with a minimum number of optical components. Another advantage is its very small optical components, enabling engine products substantially smaller in overall size than prior art projectors. Another advantage is high speed light collection. Yet another advantage is the transformation of numerical aperture in the illumination stage without relying on complex condenser lens systems. Another advantage is the inherent fundamental telecentricity in the illumination stage. Still another advantage is the remote positioning of the projection lamp to an ideal location for enclosed rear projection cabinets without sustaining attendant geometric efficacy losses. Yet another advantage is the inclusion of the primary polarizing PBS cube component in the illumination stage before the condenser lens, rather than the imaging stage after the condensing lens. Another advantage is a short back focal length (BFL) imaging stage, substantially reducing projection lens cost and manufacturability.

One advantage of an inventive aspect of the present invention is to provide an improved image projection engine architecture.

Another advantage of an inventive aspect of the present invention is to provide an improved projection engine.

Another advantage of an inventive aspect of the present invention is to provide an improved projection engine through a minimum number of components and significantly reduced complexity.

Another advantage of an inventive aspect of the present invention is to provide a rear-projection engine viable for use in consumer television, computer monitors, and broader, general use.

Another advantage of an inventive aspect of the present invention is to provide an improved cost-performance front-projection engine for commercial or business uses.

A further advantage of an inventive aspect of the present invention is to improve basic engine functionality such as efficiency and contrast performance.

Another advantage of an inventive aspect of the present invention is the elimination of dichroic components operating at oblique angles within a retroreflective imaging stage.

A further advantage of an inventive aspect of the present invention is to improve image quality performance by operating the primary color processing function in the magenta and green wavebands such that the subsequent red-blue color separation occurs in the vacant portion, or notch, of the magenta waveband.

Another advantage of an inventive aspect of the present invention is a simple illumination stage which delivers ideal geometrically constructed light to the imaging stage containing the reflective liquid-crystal-on-silicon imagers.

Still another advantage of an inventive aspect of the present invention is a solid, cemented imaging stage combination which eliminates mechanical positioning hardware in a product engine assembly.

Another advantage of an inventive aspect of the present invention is an engine imaging stage wherein waste light and rejected light caused by polarization and color separation losses are eliminated by specific means and implementations.

Another advantage of an inventive aspect of the present invention is imaging stage 'exit ports' within the imaging prism subassembly which remove waste light immediately after it is created in the imaging stage.

The above and other preferred features of the invention, including various novel details of implementation and combination of elements will now be more particularly described with reference to the accompanying drawings and pointed out in the claims. It will be understood that the particular methods and apparatus embodying the invention are shown by way of illustration only and not as limitations of the invention. As will be understood by those skilled in the art, the principles and features of this invention may be employed in various and numerous embodiments without departing from the scope of the invention.

BRIEF DESCRIPTION OF THE DRAWINGS

Reference is made to the accompanying drawings in which are shown illustrative embodiments of aspects of the invention, from which novel features and advantages will be apparent.

DETAILED DESCRIPTION OF THE DRAWINGS

Turning to the figures, the presently preferred apparatus and methods of the present invention will now be described.

Figure 1:
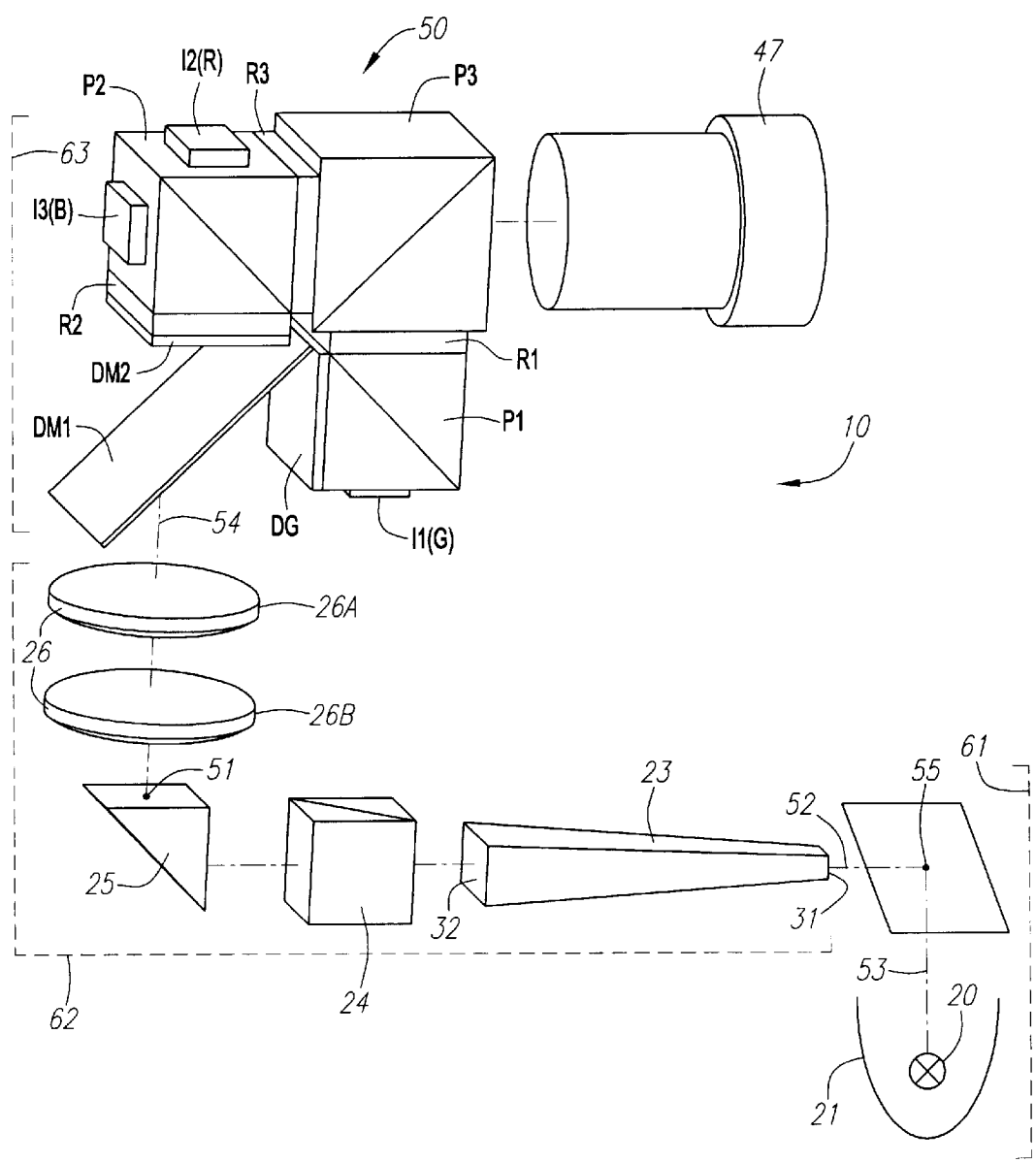
FIG. 1 is an oblique view of a preferred embodiment of the reflective liquid-crystal-on-silicon projection engine architecture.

Referring now to FIG. 1, a presently preferred embodiment 10 of the present invention is shown. For explanation purposes, the presently preferred engine architecture 10 is divided into three separate and distinct optical stages or modules 61, 62 and 63. Each of these three stages 61, 62 and 63 in the engine apparatus shown in FIG. 1 contain arrangements and designs of specific components comprising the complete engine 10.

As shown in FIG. 1, a light collection stage 61 collects light at high numerical aperture and delivers condensed and compressed light through a reflecting 'cold mirror' 22, to the illumination stage 62. The illumination stage 62 processes and conditions the light from the collection stage for ideal delivery to the imaging stage 63. The imaging stage then further processes the conditioned light from the illumination stage into a projected image, directing it through the projection lens 47 to a projection screen.

Again referring to FIG. 1, the purpose of the collection stage 61 is to collect white light from an arc lamp, condense it to the tightest focus permitted by etendu limits, remove the lamp's deleterious emissions, and deliver it to the illumination stage. This is accomplished by lamp 20, reflector 21, and cold mirror 22 in a combination constituting the collection stage.

The function of the illumination stage 62 is to prepare and condition the light from the collection stage 61 for entrance to the imaging stage 63. The specific functions of the illumination stage 62 are (1) smoothing the lamp illumination structure; (2) de-circularizing the beam to a rectangular shape; (3) setting the etendu point of the engine; (4) properly transforming the numerical aperture required by the imaging stage; (5) magnifying the apertured image of the lamp to the size of the reflective imager active area; (6) rendering the collected light telecentric; (7) primarily polarizing the white light to a high quality; (8) folding the illumination axis ninety degrees to form an optional 'rotation joint' in the illumination path; (9) remoting the lamp assembly to a more viable position within a television or monitor cabinet; and (10) focusing the magnified image of proper numerical aperture onto the reflective imagers residing in the subsequent imaging stage. Each of these functions of illumination stage 62 is accomplished in total by compander waveguide 23, primary polarizing beamsplitter cube 24, folding prism 25, and condensing assembly 26, together constituting the engine's multifunction illumination stage.

The function of the imaging stage 63 is to separate the white light supplied by the illumination stage 62 into three color primary beams which are then modulated independently and directed through the projection lens to the screen. Specifically, the functions of imaging stage 63 are (1) initial separation of the polarized white light beam provided by the illumination stage 62 into green and magenta beams; (2) further separation of the magenta beam into red and blue beams inside the prism assembly 50 such that red, green and blue color primaries are established; (3) independent polarization modulation of each color primary beam by three reflective liquid-crystal-on-silicon imagers; (4) polarization analysis of the modulated beams and the recombination of the color primaries to a white light beam for image projection to the screen; and (5) removal or elimination of polarization waste and color waste produced by real components.

Figure 2A:
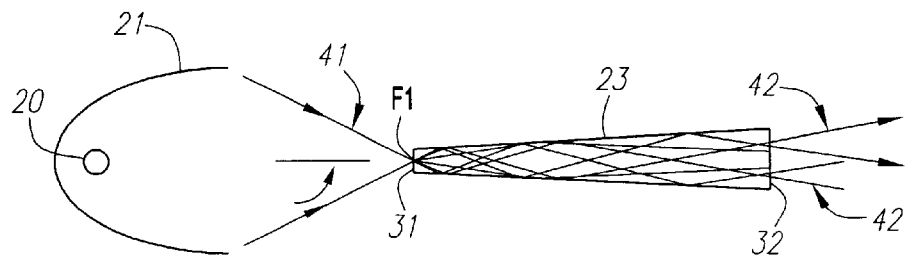
FIGS. 2a and 2b are side views of preferred embodiments for the high speed light collection and the transforming compander waveguide as a portion of the illumination stage according to the invention.
Figure 2B:
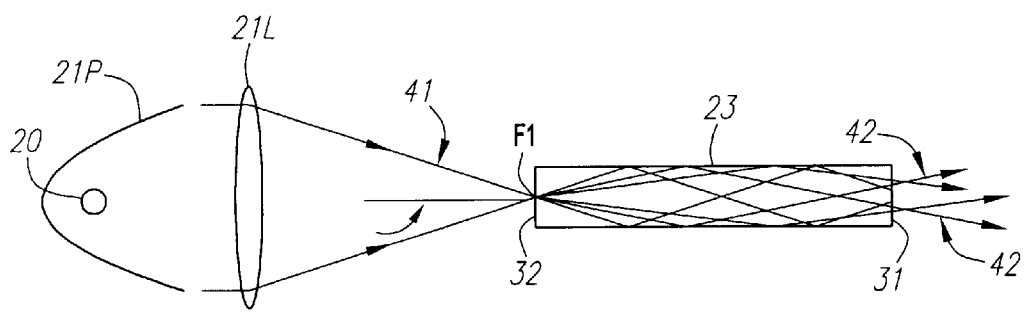

As seen in FIG. 1, the presently preferred collection stage 61 comprises a lamp 20, reflector 21 and a cold mirror 22. FIGS. 2a and 2b show two presently preferred embodiments of the collection stage interface to the illumination stage. Thus, FIGS. 2a and 2b show two methods for establishing the high speed collection principle. High speed light collection, meaning light collected from an arc lamp source 20 and compressed into an angular focus of large numerical aperture embodies the advantage of delivering more usable light from the arc lamp to the imager. High speed collection also lends itself to the further functionality requirement of short path length, greatly reducing the overall size of the optical train and hence the overall physical size of the engine in miniaturized fashion.

The cold mirror folding component 22 is not shown in FIGS. 2a and 2b for simplicity of illustration and its absence in the figure does not affect the principle illustrated. In methods well known to those of ordinary skill in the art, a cold mirror more ideally removes detrimental lamp emissions such as heat and ultra-violet radiation, and reflects only visible light. A similar component known as a 'hot mirror' can also be used to remove the lamp's detrimental emissions, but its overall efficacy is somewhat less because a hot mirror returns undesired emission back to the lamp.

Referring to FIG. 2a, an ellipsoidal reflector 21 collects and condenses light emission from lamp 20 into numerical aperture 41 to arrive at focus F1. The focus of the ellipsoid reflector 21 is directed into compander waveguide 23 through compander entrance face 31. Lamp 20 is situated at one focus of the ellipsoid reflector 21 and the entrance to the illumination stage at compander entrance face 31 is situated at the other focus of the ellipsoid. Using computer raytrace methods well known to those of ordinary skill in the art, an ellipsoid 21 can be precisely calculated to collect as much of the lamp's random light as is physically possible and condense it into the chosen angular cone specified by the numerical aperture 41. An important factor in the design of ellipsoidal reflector 21 is that while an ellipsoid reflector can condense and focus light from a single point to a single point, this is a purely theoretical condition since the emission surface of a real lamp cannot be constructed without some physical extent. The source extent of all lamps produce some level of undesired magnification from the reflector and a resulting spread of the focused light. This real world issue must be taken into account in the optimum design of the ellipsoid reflector 21. It is for this reason that arc lamps are preferred, since the physical extent of the emission region can be constructed smaller than most other types of lamps.

FIG. 2b illustrates an alternate embodiment for the high speed collection of lamp light using a paraboloidal reflector 21P rather than an elliptical reflector. The paraboloidal reflector does not condense light but rather collimates it from a single focus into a quasi-parallel beam of very low numerical aperture. Similar to the ellipsoid reflector 21 is the fact that the extent of the lamp's emission surface affects the quality of the collimation produced by the paraboloid. To increase the speed of the collection in the paraboloidal reflector case illustrated in FIG. 2b, a condensing lens 21L adds the focusing function to the parabolic reflector 21P, condensing the collected light into the appropriate numerical aperture for entrance to the illumination stage through compander entrance 31.

While the paraboloidal reflector 21P may be desirable in certain product possibilities for the disclosed architecture, the combination of a paraboloid reflector and a condensing lens 21L is generally less capable of producing as compact a focus as the ellipsoidal reflector when working at high numerical apertures. A large aperture aspheric lens is required to produce a competitive focus and these types of lens components are notoriously expensive in glass. Thus the presently preferred embodiment of the disclosed architecture specifies the ellipsoidal reflector shown in FIG. 2a, while the paraboloidal reflector and lens combination shown in FIG. 2b is given as an alternative.

Figure 3A:
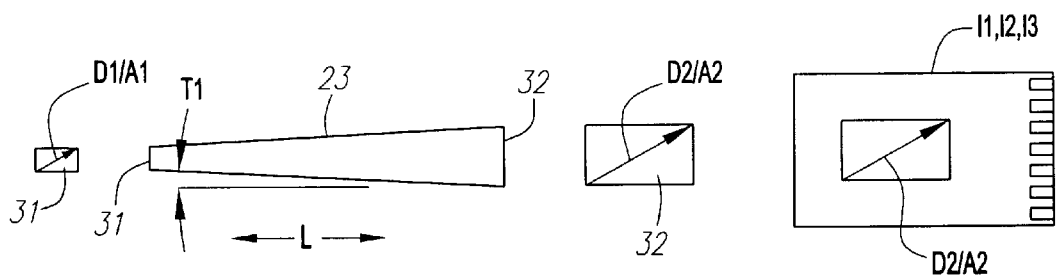
FIG. 3 is a detail view of the compander waveguide element and the size of its exit face in relation to the size of the liquid-crystal-on-silicon device active area according to the invention.
Figure 3B:
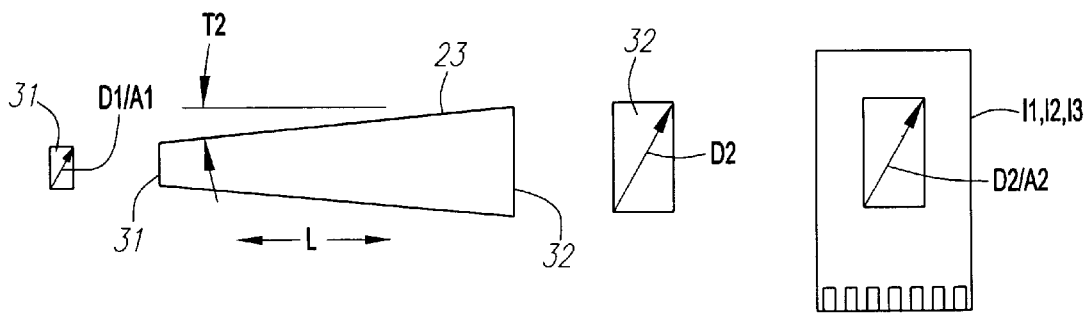

The illumination stage 62 will now be discussed. As discussed above, the compression expander waveguide 23, or "compander" component is unique to the art disclosed herein because it performs a plurality of optical functions critical to the illumination requirements of reflective liquid-crystal-on-silicon imagers. The presently preferred compander 23 of the present invention simply and inexpensively performs these functions. FIGS. 3a and 3b are top and side views of the compander waveguide component 23 of the disclosed engine architecture. Both figures illustrate the flat rectangular entrance face 31 of diagonal size D1 and area A1, and flat rectangular exit face 32 of diagonal size D2 and area A2. It should be noted that, as used herein, the term rectangular contemplates a closed planar quadrilateral with opposite sides of equal lengths a and b, and with four right angles. In the various embodiments of the present invention, the lengths a and b can be equal to each other, thereby forming a square.

Also shown in FIGS. 3a and 3b are the overall length L of the compander and taper angles T1 and T2. The compander 23 is comprised of an optical material such as glass or clear plastic embodied with four flat, polished sides of polish quality suitable for use as an optical waveguide. The "aspect ratio" of the entrance face 31 and exit face 32 of compander 23 (i.e., the relative proportion of height versus width of each face) are usually, though not necessarily, equal to one another. In addition, this aspect ratio is generally equal to that of the active area of the reflective imager device. While the aspect ratios of the compander entrance face 31 and compander exit face 32 are usually the same, the diagonal sizes of the compander entrance face 31 and compander exit face 32 (and hence their areas A1 and A2) will be different. This results in compander 23 exhibiting a taper along its elongate axis L. This taper can be seen in FIGS. 3a and 3b as having angles T1 and T2, respectively. Note that in FIGS. 3a and 3b, the aspect ratio of both compander faces are shown to be 16:9, the aspect ratio emerging as the standard for DTV images. One of ordinary skill in the art will recognize that any aspect ratio could be used, depending upon the application and its corresponding imager device aspect ratio. When the aspect ratios of the entrance face 31 and exit face 32 are the same, but the exit face 32 has a larger diagonal size, the value of taper angles T1 and T2 will depend on the length L.

FIGS. 2a and 2b illustrate how compander 23 operates in the principle of the waveguide or "light pipe." The compander utilizes the physical process of "total internal reflection" to transmit light through a wide range of angles by repetitive and confined reflection on the internal walls of an optical material in air. This results in integration of the lamp luminance structure and produces a uniform beam, while also transmitting the light without loss, as if it were traveling through a 'pipe.' The rectangular cross-section of compander 23 also results in a rectangular image aperture by de-circularizing the initial circular collection aperture established by reflector 21.

The selection of diagonal sizes D1 and D2 of the entrance face 31 and exit face 32 of compander 23 will now be discussed. Diagonal sizes D1 and D2 of the entrance face 31 and exit face 32 of compander 23 are precisely calculated based on the etendu relationship between the collection stage 61 and the imaging stage 63 and in effect, sets the 'etendu point' of the engine. Because of this, selecting the appropriate diagonal sizes D1 and D2, and hence areas A1 and A2, is very important. Etendu is a thermodynamic quantity establishing in the optical domain, the 'constant brightness theorem.' This theorem states that image numerical aperture and aperture size magnification transformations in an optical system can never yield a combination in which an image is brighter than the brightness of the light source. Thus, etendu governs the relationship between the area of an aperture and the numerical aperture solid angle of a beam passing through it. In the case of a projection engine, the etendu point determines the maximum relationship of the collection stage brightness and the imaging stage brightness. The base relation for etendu E is:

$$E = A * \Omega$$

where A is the aperture area and $\Omega$ is the solid angle contained within the numerical aperture cone of light. This product must be constant for all optical transformations occurring in the engine.

At or near the etendu point, compander 23 transforms the f/# from the high numerical aperture collection cone of the reflector, f/1 in the preferred design, to a lesser numerical aperture suitable to focus illumination into the prism assembly 50 (discussed below) and onto the active area of the imagers in their precise optical path proximity. The compander 23 transforms the f/# when the exit diagonal size D2 and corresponding area A2 is specified to be greater than the entrance face diagonal size D1 and area A1, forming tapers at the walls of the waveguide. At the etendu point, $A2 = E/\Omega$.

For equal aspect ratios, compander face areas A1 and A2 are proportional to their diagonal sizes D1 and D2, hence the magnification M is $M = D2/D1$ When exit face 32 of compander 23 has larger area than the entrance face 31 (i.e., D2 is greater than D1), the numerical aperture of the illumination stage 62 is thereby reduced, converting the illumination to a higher f/#. In the presently preferred embodiment, the illumination stage 62 transforms the f/# from f/1 to f/2.8. As seen in FIG. 2a, compander 23 outputs light having an exit cone angle 42 from the exit face 32, which is less than input cone angle 41.

The compander 23 greatly reduces or removes directionality of the input light, which results in output light that is duly mixed. Thus, the light that emerges from exit face 32 of compander 23 is essentially telecentric, meaning that each point on the exit face of the compander transmits an equal f/2.8 cone of light symmetric about the perpendicular axis and of equal intensity to the other points. This telecentric structure of the illumination light produced by compander 23 must be faithfully transferred in the focused light falling on the reflective imager active area to prevent visible artifacts in the projected image caused by all imaging stage polarization components, which includes the liquid-crystal-on-silicon imagers, as well as the retarder and polarization beamsplitter cube components.

The illumination stage 62 outputs a beam of premium illumination through compander exit face 32 that is focused into the imaging stage 63 and thus onto the reflective imager devices I1, I2, and I3 of the imaging stage 63 by condenser lenses 26a and 26b. This is essentially a focusing of exit face 32 onto the reflective imagers by condenser lenses 26a and 26b, effectively setting the "illumination aperture" of the system, meaning that the extent of compander exit face 32 becomes the aperture borders within which all illumination is contained. Focusing a near-field image of the compander exit face 32 onto the reflective devices I1, I2, and I3 is thus tantamount to focusing the system's illumination aperture onto them.

The combination of two similar condenser lenses 26a and 26b work together as a condenser assemblage 26, which focuses an image of compander exit face 32 onto the reflective devices. As described above, compander 23 has been designed such that illumination light exiting the compander through exit face 32 is of a particular angular order known as telecentric. This telecentric illumination must be maintained when this illumination is focused through the imaging stage polarization components P1, P2 and P3 and onto the reflective imager devices I1, I2 and I3 by condenser lenses 26b and 26b. Operating as assembly 26, condenser lenses 26a and 26b are specifically designed to maintain this telecentricity requirement. Maintaining illumination telecentricity at the focus of the condenser assemblage is accomplished by the precise optical design of condenser lenses 26a and 26b using methods well known in the art. In the presently preferred embodiment, this is accomplished by the use of two identical aspheric condenser lenses 26a and 26b, which are calculated and positioned such that the optical distance between them is exactly twice their effective focal lengths. It is noted that embodiments of engine 10 of the present invention can use a condenser assembly 26 comprised of only a single condensing lens, or of a more elaborate condenser system of lenses if desired.

In the presently preferred embodiment, the exit face 32 of the compander waveguide 23 has the same aspect ratio, diagonal size D2 and area A2 as the active region of the reflective silicon imager device (I1, I2 and I3). Thus, in addition to its other functions, the presently preferred compander 23 also magnifies the illumination aperture, which is simply exit face 32, to the precise dimensional size of the active area of the reflective imager. By setting the aspect ratio, diagonal size D2 and area A2 of the exit face 32 identical to that of imagers I1, I2 and I3, the function of condenser lens assemblage 26 is simply to image compander exit face 32 into the imaging stage 63 and onto the imager active area at magnification ("M") equal to one. Unity magnification between illumination aperture extent and illumination image extent results in the special case where the degree of spatial telecentricity in the illumination is inherently transferred to the image without requiring condenser lens assemblage 26 to achieve angular transformations associated with a magnification. When condenser lens assemblage 26 operates at magnification M equal to one, the assemblage 26 has equal and opposite conjugate points (explained below), performs no magnification and maintains telecentric output without angular processing. This teaching of the invention assures theoretically pure telecentricity in the illumination light delivered to imaging stage despite a simple, inexpensive condenser lens assemblage 26, replacing the costly and complex multi-lens condenser systems found in the prior art.

Another advantage of operating the condenser lens assemblage 26 at a magnification of one, and thus at identical "conjugate points," is the inherent engine design simplicity associated therewith. The conjugate points of any lens system refers to the distance to the object and the distance to the image relative to the lens system. When magnification is equal to one, the object and image distances created by condenser lens assemblage 26, i.e. its conjugate points, are of equal and opposite optical distance from the its principle reference. Thus the design of the focal properties of condenser lens assemblage 26 becomes the task of simply matching the optical path distance from its principle reference to compander exit face 32 to the optical path distance from its principle reference to reflective imagers I1, I2 and I3. This special conjugate point relationship at M=1 is thus that the two optical distances from the lens reference are simply equal to one another. This substantively reduces the cost and complexity of the condenser function while at the same time improves overall engine performance. In contrast to the embodiments of the present invention, prior art systems rely on a system of condenser lenses working at high magnification and angular transformations, resulting in higher cost, lower performance, and a complicated mathematical relationship for computation of the optical distances between its conjugate points.

Figure 7A:
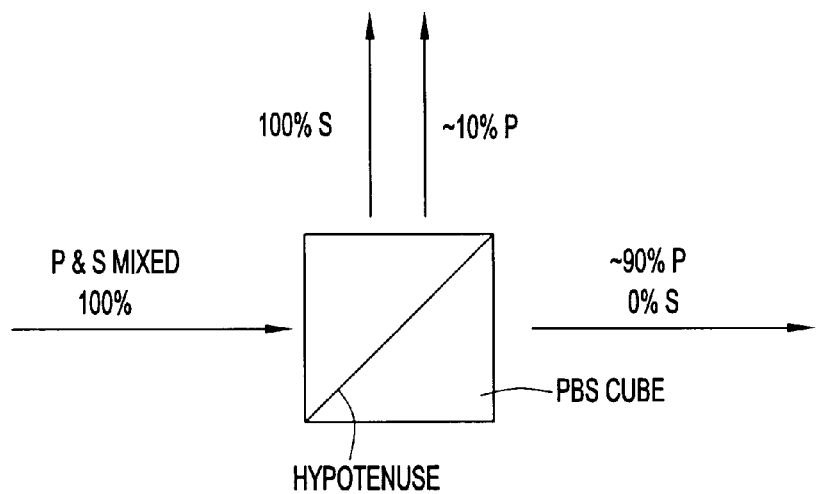
FIGS. 7a through 7c are schematic views that show the light paths, polarization states and waste light paths created by various optical components.

Since liquid-crystal-on-silicon imagers are polarization modulating devices, a key to their function in a projection engine incorporating them is the polarization beamsplitter cube, or PBS. A PBS is a cubical optical prism which separates or resolves light into the two primary polarization states, called the "components of polarization." These two components of polarization are the "P" polarization state and the "S" polarization state discussed above. A PBS cube is constructed by cementing together the hypotenuse faces of two glass forty-five degree triangular prisms. A suitable dielectric thin films is coated between the hypotenuse faces to affect the separation at the combined hypotenuse by reflecting one polarization state while transmitting the other. The optical action of a PBS cube is shown in FIG. 7a. As seen in FIG. 7a, light incident to the PBS cube containing a particular mixture of the two polarization component states P and S in some proportion is separated along two distinct axes ninety degrees apart by transmitting the P state and reflecting the S state. Unavoidable in this separation of polarization states by the PBS cube is a less-than-ideal performance of this separation, also seen in FIG. 7a. Whereas the P-polarization state is purely transmitted without traces of S state light, meaning that there is no presence of the S-polarization state in the transmitted P state beam, the reflected portion is comprised of S-polarized light accompanied by a small portion of the P-polarization light. This "leakage" of a small portion of P state light into the S state light constitutes an unavoidable "P pollution of S," which is typically ten percent, though high performance PBS cubes are available which reduce this pollution level to a five percent "P pollution of S." This process thus produces traces of waste light that must be removed from the imaging stage before it reaches projection output axis 120. A "purely polarized" beam is one which contains no traces of the opposite polarization. The level of purity or "quality of polarization" attained in a beam refers to the proportion of the desired polarization state relative to the undesired state. In the case of the PBS cube, only the transmitted P-polarized beam is "purely" polarized. The reflected S-polarized beam is not purely polarized because of its traces of P state pollution and hence has a lesser polarization quality. The remedy for this limitation of real PBS cubes is critical to an engine architecture's image performance, since the purity of both polarization states circulating in the imaging stage 63 is directly translated to picture contrast on the screen. The teachings of the invention and preferred embodiment assure that this remedy is incorporated at the design concept level.

In total, the basic function of a PBS cube is to transmit P-polarized light through its hypotenuse, and reflect S-polarized light off its hypotenuse.

Imaging stage 63 requires S-polarized light input, therefore the proper S-polarization state must emerge from the illumination stage 62. As seen in FIG. 1, inserted along the optical axis between compander exit face 32 and condenser lens assemblage 26 is the primary polarization element, PBS cube 24. In the presently preferred embodiment, the primary polarization PBS cube 24 is used in transmission, and its reflected component is discarded from the system. To achieve purely S-polarized light from PBS cube 24, rather than the purely P-polarized light intrinsic to it, PBS cube 24 is thus positioned in a ninety degrees counter-rotated attitude with respect to the attitudes of imaging stage PBS cubes P1, P2, and P3. By physically rotating primary polarization PBS cube 24 (and hence its hypotenuse plane) ninety degrees to the other PBS cubes in imaging stage 63, its purely P-polarized output beam then appears to the imaging stage 63 as pure S-polarization as a result of this physical rotation of the component. In an alternate embodiment, PBS cube 24 can be oriented such that its reflected S-polarized portion be directed to imaging stage 63, i.e. without a rotation of its hypotenuse, although further treatment of its native S-polarized reflection is necessary due to the P-pollution-of-S.

Still referring to FIG. 1, subsequent to the primary polarizer PBS cube 24 in the preferred embodiment is turning prism 25. In the presently preferred embodiment, turning prism 25 is a single forty-five degree glass prism which reflects the illumination axis to an angle ninety degrees to the incident axis. Turning prism 25 is an optional component in that it functions as a rotation axis or "optical joint" occurring at the output face of turning prism 25 about rotation point 51. The illumination axis and components incident to the turning prism can therefore be set at any angle of rotation with respect to imaging stage 63. To assure that compander exit face 32 is aligned with the imaging devices for any chosen joint rotation angle, an additional attendant twisting of the compander about its optical axis is necessary when the joint rotation angle is other than one hundred-eighty degrees. The reason for the creation of an optical joint is that the engine 10 will be packaged within a cabinet along with other components. Because televisions and monitors have certain size, shape, enclosure layout, lamp placement, airflow, aesthetic quality and form factor limitations, it is important that engine 10 be adaptable for placement within such a cabinet. Turning prism 25 has no other substantial purpose. Thus, turning prism 25 is optional in that it is not necessary if the turning function is not necessary.

The imaging stage 63 will now be discussed. Referring to FIG. 1, imaging stage 63 is illuminated by light from illumination stage 62, which presents angularity conditioned light to the imaging stage in pure S polarization. The preferred imaging stage 63 of the present invention is a great improvement over the prior art because it takes into account and properly removes waste light created by the polarization and color components.

Critical to the art of the invention is the initial separation outside the retroreflective axes of the imaging stage, of white light into green and magenta spectral wavebands, effectively splitting the imaging stage into two separated paths which operate independently. Along the magenta axis incident to prism assembly 50, magenta is then further resolved into its blue and red constituents. This runs contrary to the prior art which commonly establishes color separation into red, green, and blue spectral components simultaneously in the imaging stage.

Figure 4:
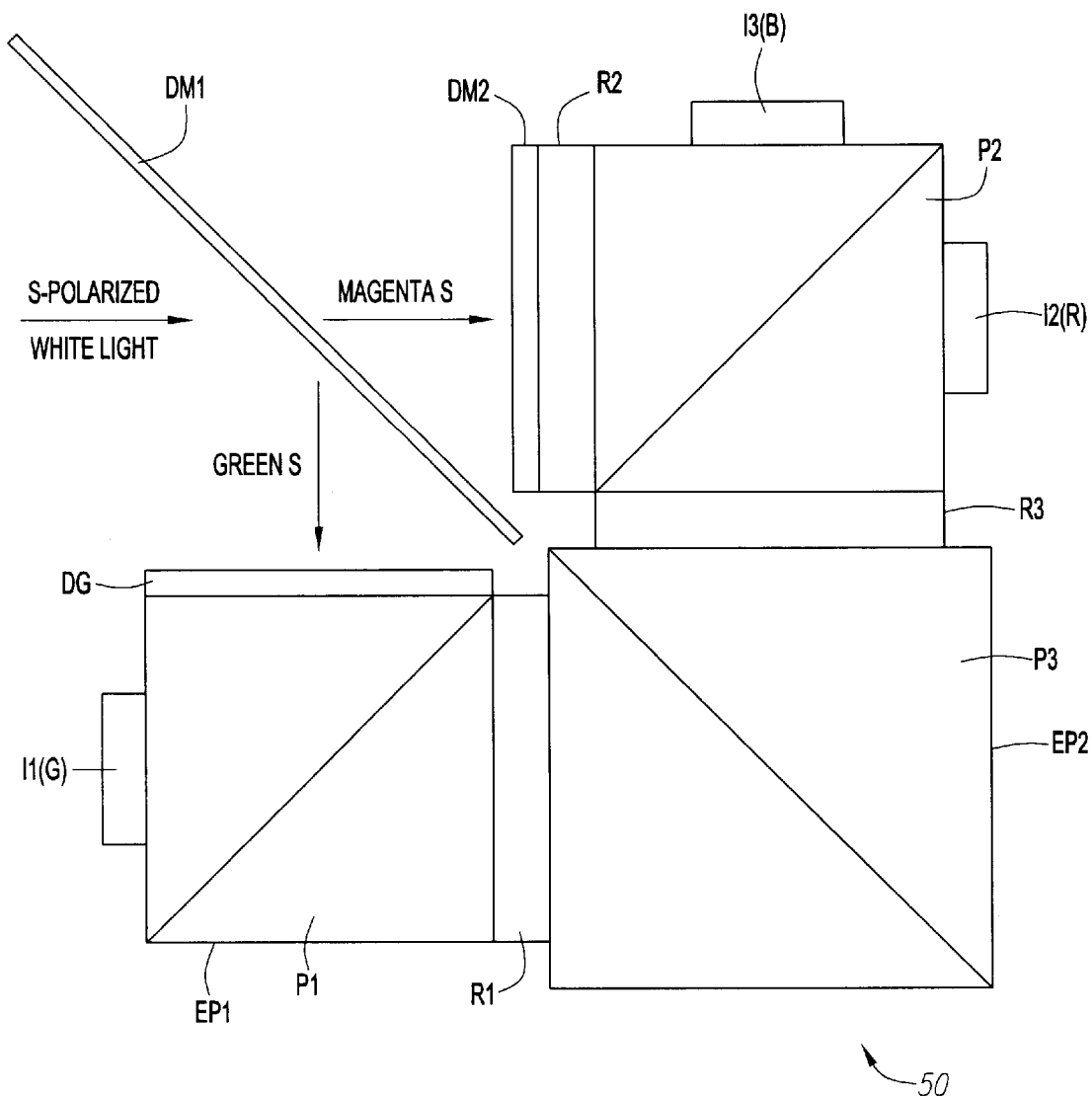
FIG. 4 is a side view of the imaging stage, including the cemented prism subassembly according to the invention, denoting the position of all spectral color components in the imaging stage.
Figure 5A:
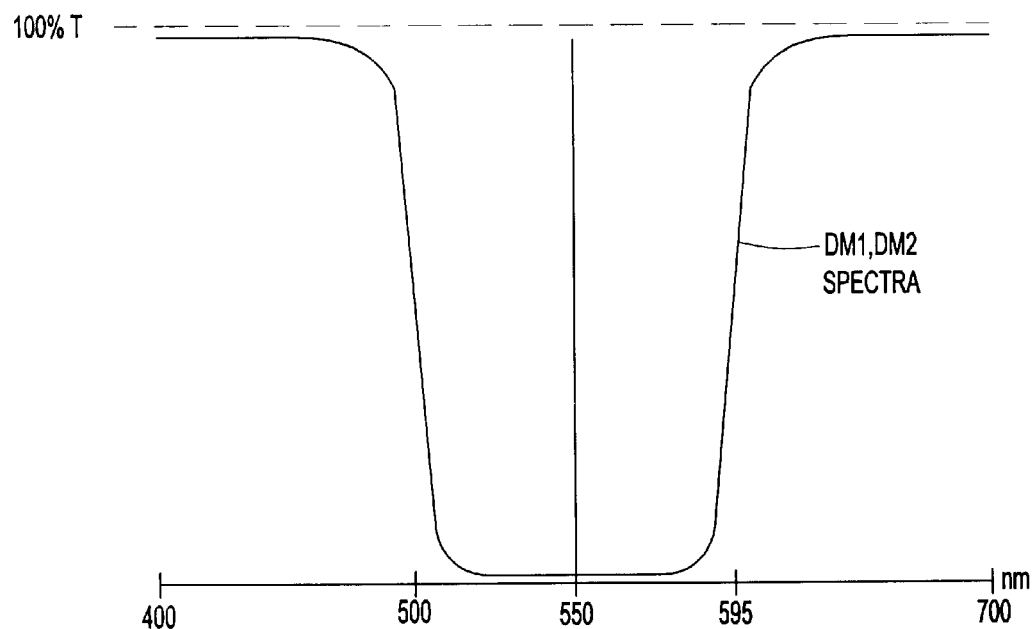
FIGS. 5a and 5b are the individual transmission spectra of the dichroic color separation components according to the invention.
Figure 5B:
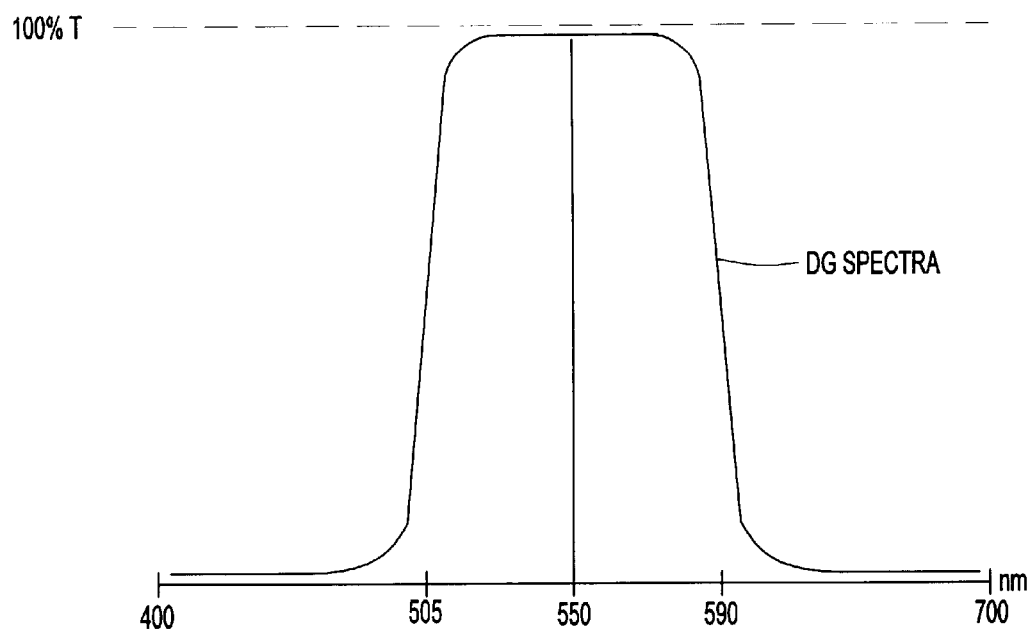

FIG. 4 depicts the color processing components in the imaging stage. A magenta transmission dichroic mirror DM1 situated at forty-five degrees in air with respect to the condenser assembly 26 divides the polarized white light from the illumination stage 62 into magenta waveband light and green wavelength light as follows. The magenta transmission dichroic mirror DM1 receives polarized white light from the illumination stage 62 and transmits magenta waveband light while reflecting green waveband light from dichroic mirror DM1. As seen in FIG. 5a, the color spectra of the magenta wavelength light is substantially comprised of the sum of red and blue primary colors at opposite ends of the full visible waveband with the central green portion removed. This type of separated spectrum is often termed a 'notch' spectrum. The green waveband reflected by DM1 has the spectrum shown in FIG. 5b. This type of separated spectrum is often termed a 'thumb' spectrum.

The light beams reflected and transmitted by dichroic mirror DM1 are presented to a prism assembly 50. Prism assembly 50, as will be seen in more detail below, is comprised of a second dichroic mirror DM2, half wave retarders R1, R2 and R3, PBS cubes P1, P2 and P3, a third dichroic mirror DG, and imagers I1, I2 and I3. In the presently preferred embodiment, these components are preferably affixed to each other by a suitable UV-cured optical cement. The result of cementing together the faces of the imaging stage component configuration shown in FIG. 4, is the single, solid prism assembly 50.

The transmission spectra for dichroic mirror DM1 depicted in FIG. 5a is available from many optics suppliers providing common dielectric thin-film deposition technology components. Because the spectral performance of dichroic mirrors are sensitive to the incident angle and surrounding medium in which they will be used, to achieve the transmission spectra shown in FIG. 5a, dichroic mirror DM1 should thus be specified for operation at forty-five degrees in air. It should be noted that while the component spectra shown in FIGS. 5a–5d are representative of the desired spectra best suited to operating the disclosed engine, the details of their waveband positions, transitions and dynamic ranges can vary somewhat in specified fabricated components without affecting the basic teachings of the invention.

Retarders R1, R2 and R3 are polarization components that function to affect the state of polarization of an incident beam. Retarder components rotate or "switch" polarization from one polarization state to the other, and are also shown in FIG. 4 cemented in their appropriate positions in the prism assembly 50. These "half-wave phase retarder" components are made of birefringent material within which the speed of light is different along its two principle axes, resulting in a ninety degree rotation, or "switch," of the state of polarized light incident thereon (for example, a switch from S-polarization to P-polarization).

Figure 7B:
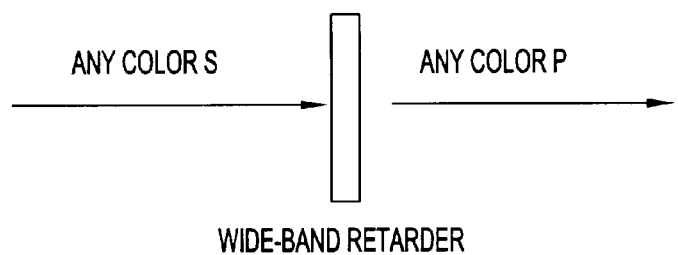
Figure 7C:
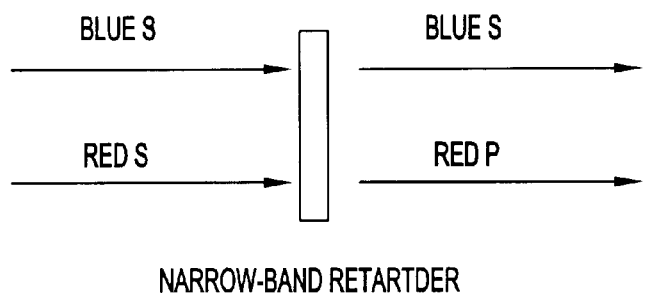

The half-wave phase retarder components utilized by the presently preferred embodiments of the present invention are of two separate and distinct types. These two types of retarders are depicted in FIGS. 7b and 7c. The first type, shown in FIG. 7b, is a "wide-band" half-wave retarder (i.e., R1), meaning that its effect on the switch of polarization state of the incident beam is independent of the incident beam's spectral distribution. Upon interaction with the wide-band retarder, light of all spectral wavelengths undergoes half-wave rotation, and hence a "switch" of its polarization state. The second type, shown in FIG. 7c, is a "narrow-band" half-wave retarder (i.e., R2 and R3), meaning that its switching effect on the polarization of the incident beam occurs only in a specified spectral waveband, such that wavelengths outside this specified waveband do not undergo a switch of polarization state. Thus, these two types of half-wave retarders, "wide-band" and "narrow-band" utilized in the preferred embodiment of the architecture are distinctive only with regard to the spectral waveband ranges in which they affect the polarization of an incident beam.

Figure 5C:
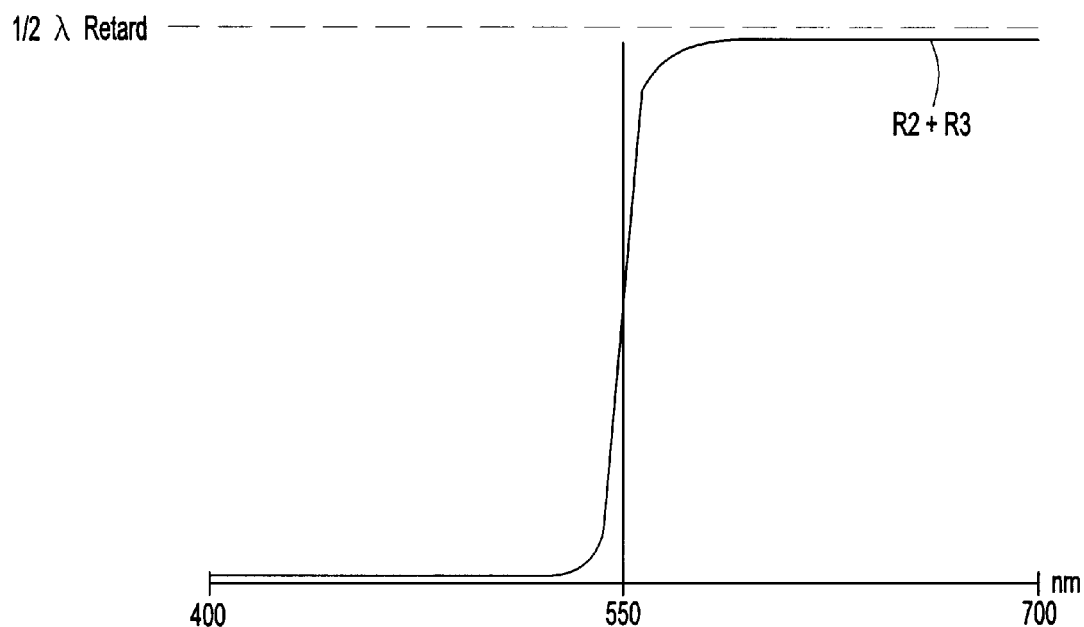
FIGS. 5c and 5d are the individual transmission spectra of the retarder color separation components according to the invention.
Figure 5D:
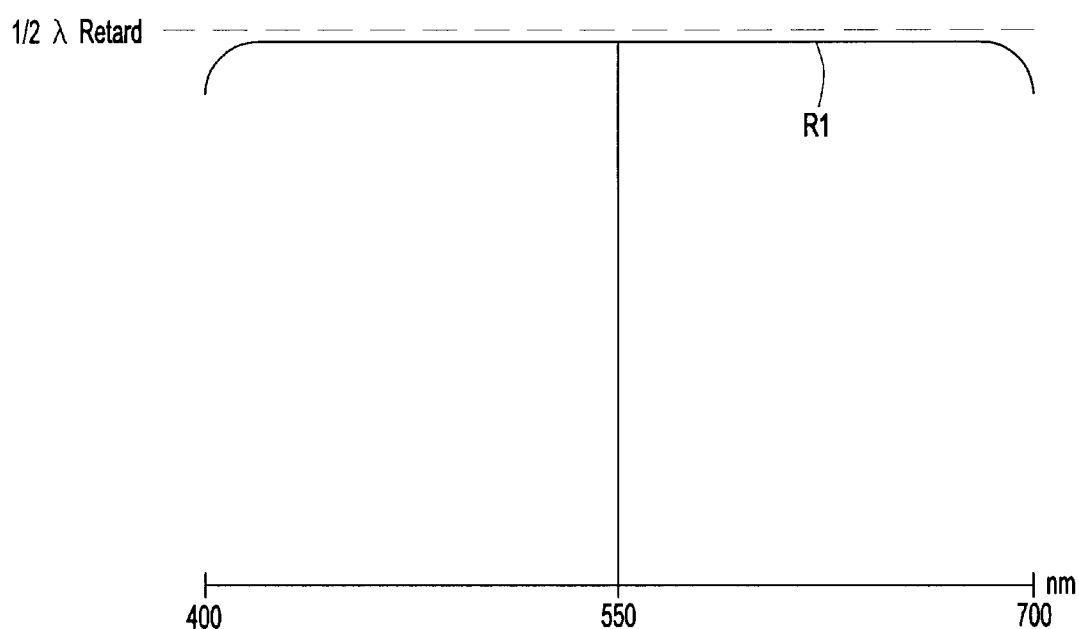

FIG. 5c depicts the retarding spectra of half-wave retarders R2 and R3, while FIG. 5d depicts the retarding spectra of half-wave retarder R1. In these spectra, a zero on the ordinate axis denotes no change in incident polarization state, and complete half-wave retard on the ordinate axis denotes a full switch of polarization state.

Figure 6A:
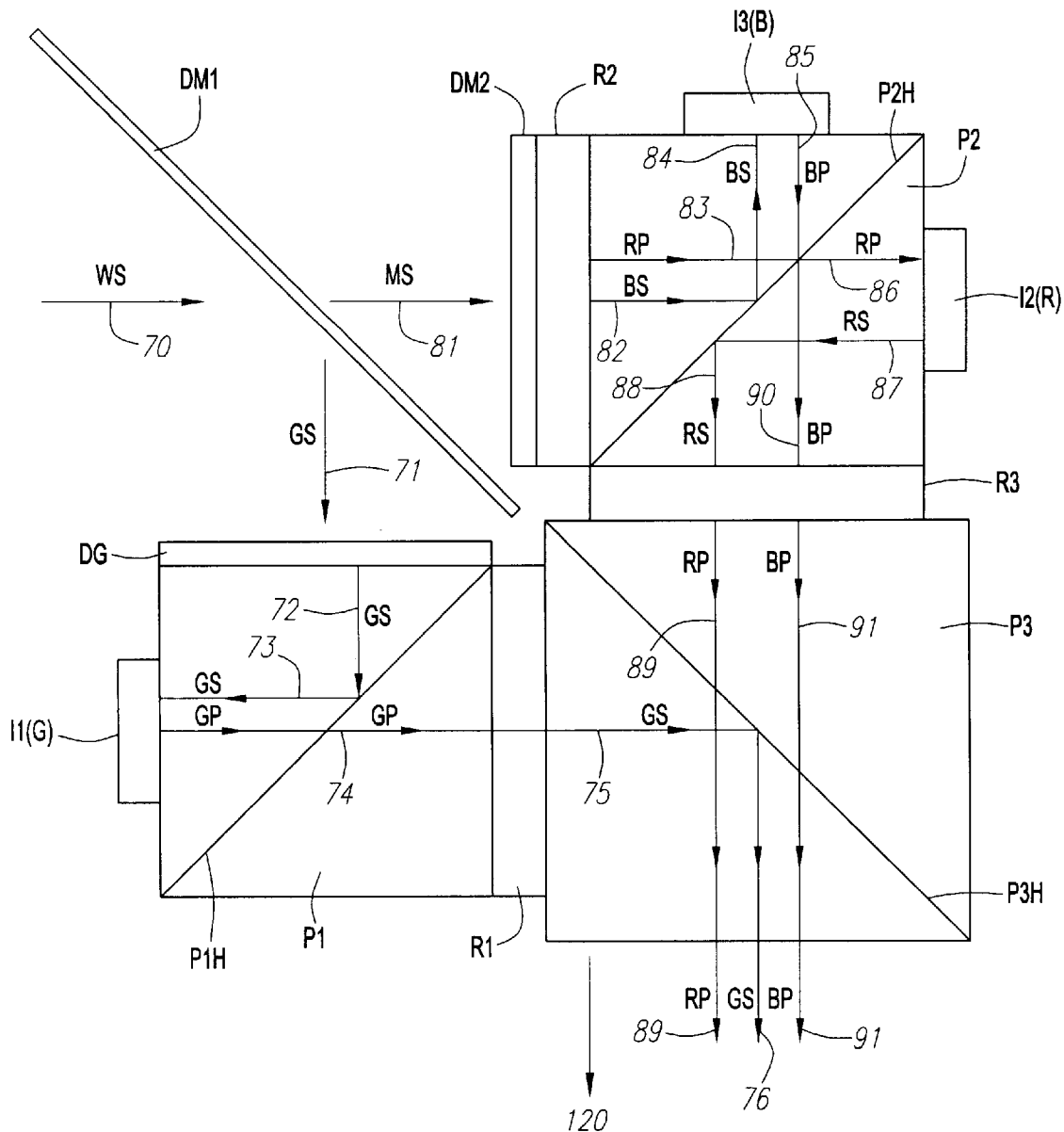
FIG. 6a is a side view of the imaging stage denoting the primary optical paths and throughput logic of each of the three primary colors.

The basic operation of the solid, cemented prism assembly 50 of the imaging stage 63 is depicted in FIG. 6a. Dichroic mirror DM1 splits the optical axis of the purely polarized white light from the illumination stage 62 into two congruent "retroreflective axes." A retroreflective axis is one that is generated in the proximity of the reflective liquid-crystal-on-silicon imager device when it is illuminated at zero degrees incidence (meaning perpendicular or "normal" to its mirrored surface). Retroreflection invokes the special condition about the optical axis where both the incident and reflected beams fall on the same path, differing only in that they propagate in opposite directions. The first retroreflective axis is a "green retroreflective axis" along which the isolated green waveband is confined. The second retroreflective axis is a "magenta retroreflective axis" along which the magenta waveband is confined. Each axis proceeds into separate and distinct PBS cubes as they enter the prism assembly 50 of the imaging stage 63.

Each beam depicted in FIG. 6a is labeled for clarity with its polarization state, S or P. As discussed, polarized white light 70 (labeled "WS" because it is white light having S-polarization) is provided by the illumination stage 62. As also discussed, dichroic mirror DM1 reflects green waveband illumination 71 having S-polarization is reflected towards PBS cube P1. A byproduct of the reflection by dichroic mirror DM1 is deleterious green band marginal transition wavelengths. If this green waste light, which has S-polarization, is not removed from the imaging stage 63, the image quality created by imaging stage 63 will be degraded. Thus, the green waveband illumination 71 is passed through green transmission dichroic 'trimming' mirror DG. In the presently preferred embodiment, dichroic trimming mirror DG is a green transmission dichroic mirror situated at zero degrees in air to the green optical axis. Dichroic trimming mirror DG reflects the undesirable green waste light caused by DM1 back to dichroic mirror DM1, which in turn reflects it back to the light source and thus out of the imaging stage. After the green waveband illumination 71 is passed through dichroic trimming mirror DG, it has been trimmed for optimum green spectrum, and the purely S-polarized green beam ("GS") 72 enters the green axis of PBS cube P1.

As depicted in FIG. 6a, the purely S-polarized green beam GS 72 is reflected at hypotenuse P1H of PBS cube P1 and delivered to a quality focus onto imager I1, which in the presently preferred embodiment is a liquid-crystal-on-silicon imager responsible for the green primary color modulation. The quality focus is a precise image of compander exit face 32 established by condenser assemblage 26. Since the trimmed incident green beam 72 along the green axis originated in the illumination stage as purely S-polarized light, no traces of P-polarization is created by reflection at the PBS cube P1 hypotenuse P1H and hence, no spurious "P-pollution-of-S" occurs in beam 73 as a result of its reflection from PBS cube P1. Thus, purely S-polarized green light 73 illuminates the active area of green reflective imager I1. The reflective liquid-crystal-on-silicon imagers used in the preferred embodiments modulate the polarization for each pixel at some level between full white and full black, corresponding to the gray scale level defined for each pixel by the picture content. These modulated levels for the entire array of pixels are thus "polarization encoded" across the extent of green reflected beam 74.

Liquid-crystal-on-silicon imagers are typically manufactured such that they "drive-to-black", i.e., the minimum luminance or "dark state" of the image pixels is achieved by a ninety degree rotation, or full switch of its polarization state by the imager device. The various gray-scale levels between full light and full dark required to construct an image is achieved by the device through a partial rotation of the polarization state, essentially an electro-optic "modulation" of the polarization a levels between zero degrees (the full light state), and ninety degrees (the full dark state). This polarization modulation is a property of the liquid crystal portion of the imager device. The maximum modulation by the liquid-crystal-on-silicon imager (i.e. its black state) occurs when the green S-polarized light 73 is rotated, or switched, to P-polarized light ("GP") 74 upon reflection from the imager.

Now P-polarized, the green reflected beam 74 transmits through hypotenuse P1H of PBS cube P1 toward output PBS cube P3. When the green beam 74 transmits through hypotenuse P1H of PBS cube P1, the quality of the P-polarization quality is increased, since any traces of S-polarization waste created by imager I1 is reflected back toward the light source at P1H. After transmitting through hypotenuse P1H, P-polarized green beam ("GP") 74 passes through wide-band half-wave retarder R1, which affects a full 90° polarization switch of green beam 74. It thus emerges from wide-band half-wave retarder R1 into PBS cube P3 as S-polarized green beam ("GS") 75. S-polarized green beam 75 then reflects off hypotenuse P3H of output PBS cube P3 to exit output polarizer P3 along projection axis 120 as an S-polarized green beam ("GS") 76. Output polarizer P3 essentially analyses, or "decodes" the polarization values encoded by imager I1 onto the green beam pixels, thus converting polarization values to luminance values.

The illumination path of the magenta waveband beam will now be discussed with reference to FIG. 6a. Unlike the green axis, the magenta waveband beam must be further split into additional color wavebands, specifically red and blue wavebands. As depicted in FIG. 6a, the purely S-polarized magenta beam 81 ("MS") passes through a second magenta dichroic mirror DM2 situated at zero degrees in air to the optical axis, which provides a spectral trimming function similar to dichroic trimming mirror DG along the green axis. That is, its function is only to reflect out of the imaging stage, magenta waste light created by DM1. The trimmed magenta light is then separated into its red and blue constituents through the combination of narrow-band half-wave retarder R2 and magenta axis PBS cube P2. Narrow-band half-wave retarder R2 switches the polarization only in the red waveband portion of magenta beam 81, thereby converting only the red waveband portion from S-polarization to P-polarization. Thus, a P-polarized red beam ("RP") 82 emerges from retarder R2. P-polarized red beam 82 is transmitted through hypotenuse P2H of PBS cube P2 in a similar way to the green axis. This P-polarized beam was previously brought to a quality focus by condenser assemblage 26 onto liquid-crystal-on-silicon imager I2 responsible for the red primary color. As with the green waveband beam discussed above, by using the "drive-to-black" logic of the liquid-crystal-on-silicon imager I2 (i.e., the minimum luminance or 'dark state' of the image pixel is achieved by a full ninety degree rotation, or switch of its polarization state), maximum modulation occurs when the red P-polarized beam 86 is rotated to red S-polarized light 87 by imager I2, thus encoding the image in polarization level when it reflects the red beam.

Red S-polarized beam 87 then travels towards hypotenuse P2H of PBS cube P2, where it is reflected to narrow-band half-wave retarder R3. Narrow-band half-wave retarder R3 rotates, or switches, S-polarized red beam 88 ninety degrees so that red P-polarized beam ("RP") 89 is incident to output PBS cube P3. Now P-polarized, red beam 89 transmits through hypotenuse P3H of PBS cube P3 where it is combined with green output beam 76 to exit the imaging prism along output axis 120. The P-polarization quality of the red beam 89 is increased when it transmits through hypotenuse P3H of PBS cube P3, due to the fact that any P state pollution waste light occurring from retarder R3 in beam 88 transmits through hypotenuse P3H rather than reflected to the red output beam 89 along axis 120. In a similar fashion to the green beam, output polarizer P3 essentially analyses, or "decodes" the polarization values encoded by imager I2 onto the red beam pixels, thus converting polarization values to luminance values.

Like the red color separation described above, blue color separation also occurs along the magenta axis. The function of narrow-band half-wave retarder R2 on the blue waveband portion of magenta beam ("MS") 81 differs from that of the red portion in that narrow-band half-wave retarder R2 does not switch the polarization of the magenta beam's blue portion. Thus, a blue beam ("BS") 82 emerges from retarder R2 in S-polarization, the state opposite to that of red beam ("RP") 83, which as discussed above, has P-polarization.

S-polarized blue beam ("BS") 82 is reflected at hypotenuse P2H of PBS cube P2 and comes to a quality focus from condenser assemblage 26 onto liquid-crystal-on-silicon imager I3 responsible for the blue primary color. Thus, S-polarized blue light ("BS") 84 illuminates the active area of blue imager I3.

Again using the 'drive-to-black' logic of the preferred embodiment (which as discussed, rotates the polarization state to a maximum of 90° such that the blue waveband now has P-polarization), maximum polarization modulation occurs when the blue S-polarized light beam 84 is switched to a blue P-polarized beam ("BP") 85 upon reflection from imager I3. Blue P-polarized beam ("BP") 85 then transmits through hypotenuse P2H of PBS cube P2 to become P-polarized blue beam ("BP") 90 which passes through the second narrow-band half-wave retarder R3. Due to the properties of retarder R3 shown on FIG. 7c, the P-polarized blue beam ("BP") 90 is not affected by it. Thus, P-polarized blue beam ("BP") 91 emerging from second retarder R3 is incident to combining PBS cube P3. Now P-polarized, blue beam ("BP") 91 plunges through hypotenuse P3H of PBS cube P3 where it is combined with green and red output beams 76 and 89 to exit the imaging prism along output axis 120. In a similar fashion to the green and red beams, output polarizer P3 essentially analyses, or "decodes" the polarization values encoded by imager I3 onto the blue beam pixels, thus converting polarization values to luminance values.

The result of the disclosed arrangement and specification of optical components in the preferred embodiment based on the imaging stage throughput paths of the architecture is three separately modulated color primary beams combined along output axis 120. The above analysis of the basic throughput paths, however, is not sufficient to an understanding of how the embodiments of the present invention dramatically improve performance when compared to the prior art. To more fully understand the dramatic improvement over the prior art, a waste light analysis must be performed. As will now be seen, the presently preferred embodiments effectively eliminates all waste light after it is created by each polarization and color component in the imaging stage, demonstrating how well the presently preferred engine 10 of the invention works.

Color separation and combining components always produce a portion of deleterious waste light at the junction or transition of the separated spectra. See, e.g., FIGS. 7a–7c and the discussion of those figures. Projection engines involve numerous color separation and combining components, and each produces deleterious waste light. In the preferred embodiments of the invention, for example, five components related to color affectations are used, three dichroic mirrors (DM1, DM2 and DG) and two waveband sensitive retarders (R3, and R2). And with each color related component, a portion of their throughput yields deleterious waste light, which degrades image performance. These spectral transition regions are shown for the dichroic mirrors in FIGS. 5a and 5b, and for the narrow waveband retarder in FIG. 5c. The sloped portion of the spectral curves represents these transition regions. Waste light is produced in these "transition regions", or waveband seams of the color components, where separated wavebands abut. In a dichroic mirror, one waveband is transmitted and the other reflected, yet a transition region exists between these wavebands where the abutting portion of the spectrum is both transmitted and reflected, causing certain wavelengths to appear in both the transmitted and reflected paths. Similarly in transmission through the narrow waveband retarders, the polarization state of one waveband is switched while the polarization state of other waveband is not affected. Yet a transition region exists between these wavebands where an abutting portion of the spectrum is transmitted in both polarization states. Thus, each of these components, upon interaction with incident light, produces a portion of waste light immediately after the interaction.

Waste light spectra pollutes the basic functionality of the projection engine, resulting in reduced contrast and image quality. It is analogous to automobile exhaust, because it cannot be used or controlled, and is tantamount to pure disorder and must be removed. Prior art engines like those discussed above do not disclose any means for the elimination of waste light produced by color separation and combining processes. The waste light condition is exacerbated in projection engine architecture specific to reflective liquid-crystal-on-silicon imagers since the retroreflective imaging path to and from the imagers must operate in both polarization states and are not separable. When retroreflective optical paths operate in both P-polarization and S-polarization going to and from the imager, prior art engines cannot improve one polarization state without adversely affecting the other. In contrast, the presently preferred embodiments of the present invention are fundamentally designed to eliminate waste light from each component immediately after it is created, effectively removing all deleterious waste light caused by the color separation components in the engine.

For the engine 10 of the present invention to remove waste light, the color separation components of the embodiments of the present invention must be arranged in such a manner that ensures waste light from all color separation and combining components travels along optical paths that remove it before it reaches output axis 120 of imaging stage 63. This concept is embodied in the form of strategically placed optical exit ports, or 'dump ports' in prism assembly 50. These dump ports (described below) provide escape paths for the waste light immediately after it is created and before it can reach the projection output axis 120. By removing the waste light before it can reach output axis 120, projected image contrast, throughput efficiency, color purity and overall image quality are not degraded by waste light. As an example of strategically placed optical exit ports, one can see that dichroic mirrors DM1, DM2 and DG are placed outside the prism assembly 50 and thus operate in only one polarization state, S. Because of this, waste light created by dichroic mirrors DM1, DM2 and DG does not enter the imaging stage.

The arrangement and selection of components renders the preferred embodiments of the engine 10 capable of either removing waste light through exit ports, or else rendering the engine insensitive to it. The place where the engine is rendered insensitive to waste light is in the blue-red color separation function of retarders R2 and R3 in the magenta portion of imaging stage 63. While the spectral transition region of retarders R2 and R3 produces a deleterious waveband seam as shown in FIG. 5c at a wavelength of 550 nm, the engine is not sensitive to it, since that portion of the imaging stage operates within the "magenta notch", where no 550 nm light exists. The magenta notch is essentially a spectral dead zone in the magenta band that is not combined into the projected image. By operating the red/blue color separation of retarder R3 in the magenta notch, its transition wavelengths occur wholly within the magenta band notch region and thus are substantially 'hidden' from the projected output of the engine. The green portion of the imaging stage does not invoke a further color separation as does the magenta, therefore this issue is not pertinent to it.

Polarization components, i.e., PBS cubes P1, P2 and P3, also produce waste light in the form of less-than-perfect polarization quality in one of the two separated polarization states. As was discussed earlier and referring again to FIG. 7a, the S-polarized reflected beam of the polarization beamsplitter cube always contains "P-pollution-of-S." Since the final contrast in the two polarization states is directly converted to luminance contrast in the projected image, waste light created by polarization beamsplitter cubes in the imaging stage must also be removed after it is created and before it reaches imaging stage 63 output axis 120. As will be shown below, the use of sequential PBS cubes (P2 and P3, and P1 and P3) in a triad arrangement within the imaging stage as illustrated in the presently preferred embodiment shown of FIG. 4, are fundamental to the removal of polarization waste light.

The reflective liquid-crystal-on-silicon imagers are also polarizing components, although these components affect an electro-optic modulation of polarization state rather than a separation of the states as in the PBS cube. Regardless, the imager devices themselves also produce polarization waste light that must similarly be made to exit the imaging stage after it is created and before it reaches projection output axis 120. Actual liquid-crystal-on-silicon imager components (as opposed to ideal components) produce less-than-perfect polarization switching upon reflection, leaving traces of the undesired polarization state light mixed with the desired state. This undesirable polarization state light must also be removed.

Deleterious waste light created by color and polarization components should not be confused with scattered or spilled light within the engine, often termed 'stray light.' Stray light is deleterious light of improper or random direction caused by material scattering, haze, or the unsuitable design and fabrication of engine components. In contrast, waste light is deleterious light which resides within the numerical aperture and optical pupils of the imaging stage. It occurs along the axes of the engine in a direction range exactly identical to the desired projected light output and is thus geometrically superimposed on it.

Prior art engine architectures fail to consider and thus do not make an attempt to remove deleterious waste light as a fundamental concept of the architecture. The various embodiments of the present invention utilize an effective means for coping with and eliminating waste light created by real component physicality limitations. The manner in which the presently preferred embodiment of the invention completely extinguishes waste light from the projected image will be discussed with reference to FIGS. 6b–6d.

Figure 6B:
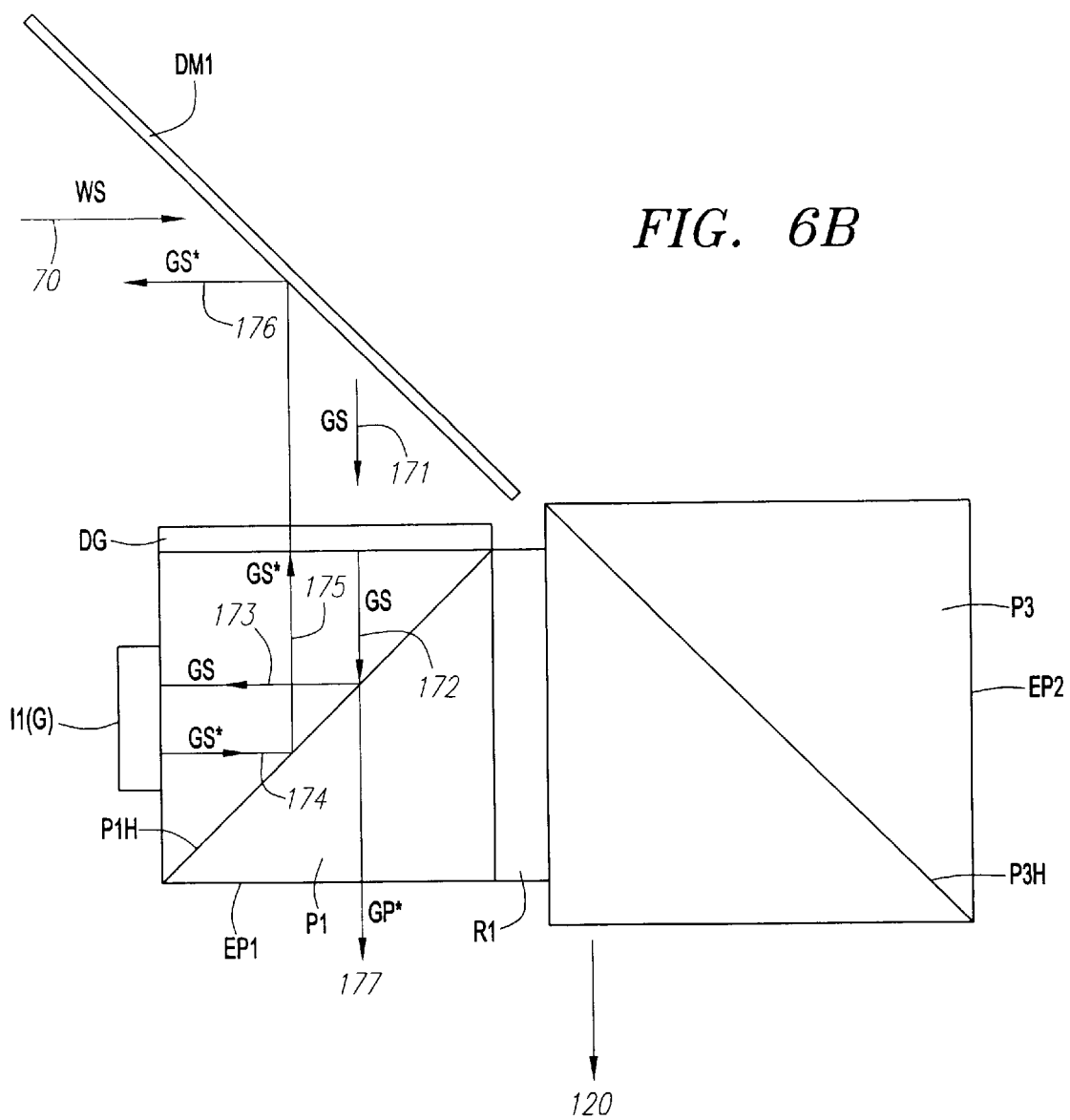
FIGS. 6b through 6d are side views of the imaging stage denoting the waste light paths and corresponding exit ports for each primary color created by the polarization and color separation leakage from less-than-perfect real components.

Referring to FIG. 6b, the undesirable polarizations and beam paths of deleterious waste light along the green axis is mapped and analyzed. This will sometimes be referred to herein as the green 'dump' paths, i.e., removal of green waste light after it is created within the imaging stage. The waste light beams are designated in FIG. 6b by an asterisk (*) beside the polarization state label. Green waveband beam 171 in S-polarization enters prism assembly 50 by passing through green dichroic trimming mirror DG and into green axis PBS cube P1. Waste light GS* created by dichroic mirror DM1 and DG does not enter the imaging path because it is reflected by dichroic mirror DG along path 176 back to the source. As discussed, hypotenuse P1H of PBS cube P1 splits S-polarized green beam 172 into purely S-polarized green light 173 and undesirable green waste light beam "GP*" 177, which has P-polarization. In addition, traces of P-polarized light occurring in beam 172 can also result from less-than-perfect primary polarization by PBS cube 24 in illumination stage 62. The arrangement of the PBS cube P1 is such that this P-polarized green waste light beam "GP*" 177 transmits through hypotenuse P1H and exits the imaging stage through exit port EP1. As discussed above, the desirable S-polarized green light GS 173 is reflected onto imager I1.

Green polarization waste is also created when traces of unmodulated light is reflected from imager I1 along the same path as the desired modulated light. Waste light beam GS* 174, which remains in S-polarization, is produced by imager I1. In the presently preferred embodiments of the invention, green waste beam GS* 174 is fully reflected at hypotenuse P1H of PBS cube P1 as waste light beam GS* 175, passes through dichroic mirror DG, is reflected by dichroic mirror DM1 as green light beam GS* 176 and out of the imaging stage 63. Thus, all green waste light has been either reflected back to the light source along path 176 or ported out of the imaging stage through exit port EP1 along path 177. Thus, none of the green waste light enters output PBS cube P3 and hence does not appear in the desired output path 120 of the engine.

The removal of red waveband waste light will now be discussed with reference to FIG. 6c. As discussed above, the S-Polarized magenta beam 81 emerges from dichroic mirror DM1, and passes through dichroic trimming mirror DM2. Waste light from DM1 and DM2 is reflected back toward the source in a manner similar to the green axes. The S-Polarized magenta beam 81 passes through narrow-band half-wave retarder R2. Retarder R2, as discussed, switches the polarization of the red waveband portion of the magenta beam, thereby converting the red waveband portion from S-polarization to P-polarization. Thus, a P-polarized red beam ("RP") emerges from retarder R2. However, the transition regions of retarder R2 (i.e., where the S-polarization magenta light beam 81 is split into a P-polarized red light beam and an S-polarized blue light beam) also creates a waste red light beam 100 containing both polarization states RS* and RP*. In the presently preferred embodiments of the present invention, this red-blue transition region of narrow-band half-wave retarder R2 takes place in the center of the spectral "dead-zone" of the magenta notch. This assures that red waste beam 100 containing RS*+RP* is of low magnitude because the color wavelengths closest to the spectral transition seam are not substantially present in the center of the magenta notch. However, this magnitude is still non-zero within the magenta notch for even the best dichroic mirrors, and hence must be made to exit the imaging stage.

Figure 6C:
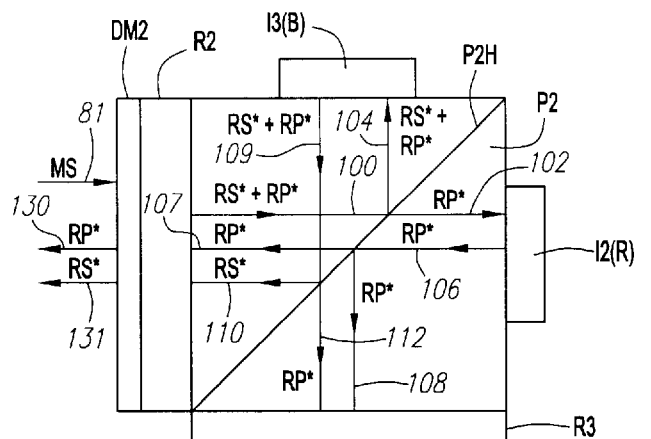

As seen in FIG. 6c, red waste beam 100 contains both RS* and RP* components of polarization. Red waste beam 100 is split at hypotenuse P2H of PBS cube P2. Most of the P-polarization red waste beam RP* 102 transmits through hypotenuse P2H of PBS cube P2 as red waste beam 102 towards red imager I2, remaining in P-polarization. The portion of red waste beam 100 not transmitted as red waste beam 102 (i.e., the S-polarization red waste) is reflected in S-polarization as red waste beam 104 onto blue imager I3. As discussed, the basic physics of any PBS cube are such that a trace of "P-pollution-of-S" RP* also accompanies the S-polarized RS* and together comprise beam 104. Thus, blue imager I3 receives RS*+RP* red waste beam 104. Since reflective liquid-crystal-on-silicon imagers operating in drive-to-black mode produce a less-than-perfect polarization switching, red imager I2 and blue imager I3 reflect their portions of the red waste light without switching it. Thus, red waste light RP* 102 illuminating red imager I2 and red waste light RS*+RP* 104 illuminating blue imager I3 will be present in the retroreflected beams from imagers I2 and I3, respectively. The red imager I2 reflects a red waste light beam with P-polarization RP* 106, which subsequently encounters hypotenuse P2H of PBS cube P2, where most of it transmits through hypotenuse P2H as red waste light beam RP* 107 back toward the illumination stage 62 and out of the imaging stage along paths 130 and 131. Again due to the physics of PBS cubes, a further reduced trace amount of red waste light beam 106 is by reflected hypotenuse P2H of PBS cube P2, yielding red waste light RP* beam 108. The manner in which red waste light RP* beam 108 is removed will be discussed below.

Similarly, blue imager I3 reflects the S-polarization RS* portion of red waste beam 104 as red waste beam RS*+RP* 109. Because of the drive to black mode operation of liquid-crystal-on-silicon-imager discussed above, red waste beam RS*+RP* 109 comprises mostly S-polarized red light RS*, but also contains traces of P-polarized red waste RP*. The majority of red waste beam RS*+RP* 109 is reflected at hypotenuse P2H of PBS cube P2 back toward illumination stage 62 as red waste beam RS* 110. The remainder of red waste beam RS*+RP* 109 transmits through hypotenuse P2H of PBS cube P2 as red waste beam RP* 112, which has P-polarization. Thus, red waste light beams RP* 108 and RP* 112 emerge from hypotenuse P2H. Because this waste light is red, at narrow-band half-wave retarder R3 the polarization of both red waste light beams RP* 108 and RP* 112 are switched. Retarder R3 is identical to retarder R1 and similarly this further polarization switch also takes place in the magenta notch where wavelengths sensitive to retarder R3's transition region are not present. Thus red waste light beams RS* 114 and 116 emerge from retarder R3 in pure S-polarization when they enter output PBS cube P3. Because of this S-polarization purity in red waste beams RS* 114 and RS* 116 (meaning P-polarized light is not present), no "P-pollution-of-S" occurs at hypotenuse P3H of output PBS P3 and thus P3H reflects all of the red waste light along beams 117 and 118 which exit the imaging stage through exit port EP2. This assures that no traces of red waste light will appear along projection path 120.

The removal of blue waveband waste light will now be discussed with reference to FIG. 6d. As previously described in the magenta axis, S-polarized magenta beam 81 emerges from dichroic mirror DM1 and passes through dichroic trimming mirror DM2. The waste from DM1 and DM2 is reflected back toward the source, and S-Polarized magenta beam 81 passes through narrow-band half-wave retarder R2. Retarder R2 does not switch the polarization of the blue waveband portion of the magenta beam as it did in the red waveband, allowing blue light to pass through R2 unaffected as S-polarized. Thus, an S-polarized blue beam ("BP") emerges from retarder R2. Again however, the transition regions of retarder R2 (i.e., where the S-polarization magenta light beam 81 is split into a P-polarized red light beam and an S-polarized blue light beam) creates a waste blue light beam 119 containing traces of P-polarized BP* waste. Similar to the red waste process, the red-blue transition region of narrow-band half-wave retarder R2 takes place in the center of the spectral "dead-zone" of the magenta notch. This assures that blue waste beam 119 containing BP* is of low magnitude because the color wavelengths closest to the spectral transition seam are not substantially present in the magenta notch. However, this magnitude is still non-zero within the magenta notch for even the best dichroic mirrors, and hence must be made to exit the imaging stage.

Figure 6D:
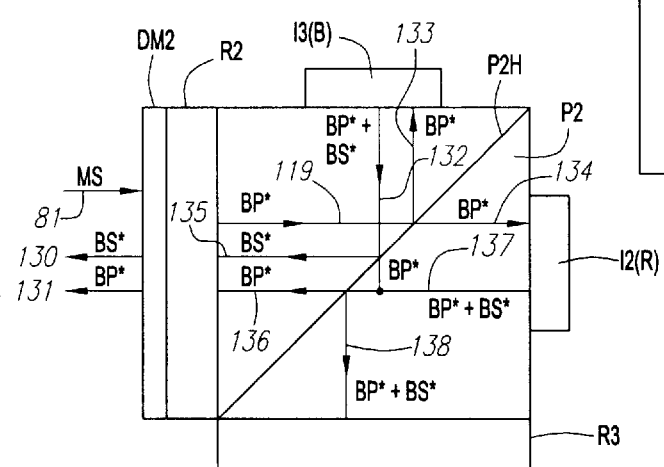
Figure 6D:
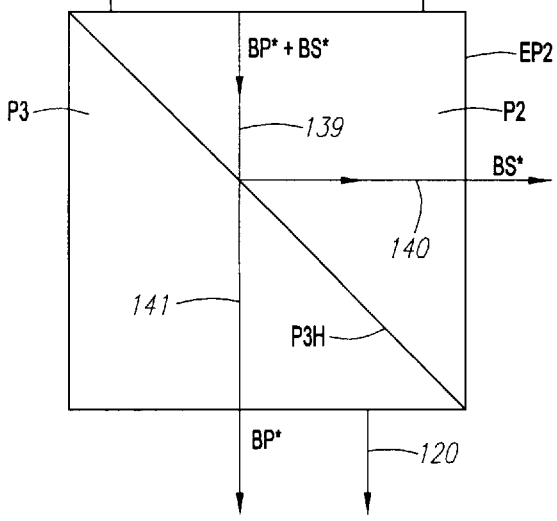

As seen in FIG. 6d, blue waste beam 119 contains BP* polarization. Blue waste beam 119 is split at hypotenuse P2H of PBS cube P2. Most of the P-polarized blue waste beam BP* 134 transmits through hypotenuse P2H of PBS cube P2 toward red imager I2, remaining in P-polarization. The portion of blue waste beam BP* 119 not transmitted at P2H as blue waste beam 134 is reflected at P2H as blue waste beam BP* 133 onto blue imager I3 because as discussed, the basic physics of the PBS cube are such that a trace of P-polarization appears in the reflected portion of the beam comprising beam 133. Thus, blue imager I3 receives BP* blue waste beam 133. Since reflective liquid-crystal-on-silicon imagers operating in drive-to-black mode produce a less-than-perfect polarization switching, red imager I2 and blue imager I3 reflect their portions of the blue waste light without switching it. Thus, blue waste light BP* 134 illuminating red imager I2 and blue waste light BP* 133 illuminating blue imager I3 will be present in the reflected beams from imagers I2 and I3, respectively. Red imager I2 reflects a blue waste light beam with P-polarization BP* and S-polarization BS* 137, which subsequently encounters hypotenuse P2H of PBS cube P2, where most of the P-polarized blue beam BP* transmits through hypotenuse P2H as blue waste light beam RP* 136 back toward the illumination stage 62 and out of the imaging stage along path 131. The remaining S-polarized blue waste BS* from beam 137 will be reflected by hypotenuse P2H of PBS cube P2, as discussed below. The P-polarized blue waste light BP* from blue imager I3 beam 132 transmits through P2H and joins blue waste light BS* from red imager I2 to form a blue waste beam BS*+BP* 138, which falls incident on retarder R3.

Because this waste light beam 138 is blue, narrow-band half-wave retarder R3 does not switch the polarization of blue waste light beam BP*+BS* 138. Thus blue waste light beam BS*+BP* 139 emerges unaffected by retarder R3 when it enters output PBS cube P3. Again, due to the physics of PBS cubes, the S-polarized BS* portion of blue waste beam 139 is completely reflected at hypotenuse P3H of output PBS cube P3 along beam 140 which exit the imaging stage through exit port EP2. A portion of the BP* content of blue waste beam 139 is also reflected as "P-pollution-in-S" out through exit port EP2.

The remaining portion of BP* in beam 139 transmits through P3H along beam 141, resulting in blue waste beam BP* 142 combining with the desired output light along projection output path 120, leaving a trace of purely P-polarized blue waste light along output path 120. However, the amplitude of this final trace amount of blue waste light along beam 142 has been reduced by a factor of two-thousand since it was created within the imaging stage. It is wholly invisible to the eye in the projected image and by all measure has been extinguished. If the total amount of light reaching the screen is set at 1 unit, the total trace of blue waste light appearing in the projected image relative to the desired light modulated light in the image is 0.08*0.3*0.1*0.9*0.9=0.000194 or 0.019% of the projected image light. This corresponds to a reduction in the blue waste light output to approximately one part in 5200, or 5200:1 contrast ratio, which is wholly invisible to the viewer and well below the contrast threshold of the engine output. Therefore while there is a theoretical optical path 142 along which a tiny trace amount of blue waste light can be present, its amplitude has been essentially extinguished by reducing it to invisibility.

With reference to FIG. 1, a presently preferred embodiment of the present invention using a parametric design example is described. Referring to FIG. 1, the presently preferred embodiment is be described by assigning values to the fundamental quantities of the architecture shown.

| Parameter | Label | Value |
| --- | --- | --- |
| Lamp Arc Size: | 20 | 1 mm × 0.5 mm |
| Reflector Geometry: | 21 | Ellipsoid |
| Reflector Aperture: | 21 | 75 mm |
| Reflector Collection f/#: | 21 | f/1 |
| Imager Aspect Ratio: | I1–I3 | 16:9 |
| Imager Diagonal Size: | I1–I3 | 17.7 mm |
| Compander Exit Diagonal: | 32 | 17.7 mm |
| Imaging Stage f/#: | 23 | f/2.8 |
| Optional turning: prism: | 25 | Yes |
| Imager to Proj.-Lens: B.F.L. | 63 | Minimal |
| Color Component Spectra: | FIG. 5a | to 5d |
| Collection Stage Proximity: | 61 | Remoted |

The presently preferred embodiment uses an elliptical reflector geometry for element 21, and tapered compander waveguide for numerical aperture transformation and magnification M=1. However, one of ordinary skill in the art will recognize that the invention is not limited to reflector element 21 comprised of an ellipse. As depicted in FIG. 2b, parabolic reflector geometry can also be used for reflector 21P and additional converging lens 21L yet still utilizing the teachings of the invention. Also shown in FIG. 2b, the numerical aperture transformation function can be removed from compander waveguide element 23 by replacing the tapered walls with parallel walls as depicted in FIG. 2b, yet still utilizing the teachings of the invention.

The etendu point of the imaging stage is determined by $$E = A * \Omega$$

where A is the active area of the imager device I1, I2 and I3 as well as the area of the compander waveguide exit face 32, and Ω is the solid angle within the imaging stage numerical aperture. In the preferred embodiment shown, the area of the device and compander exit is A=133.7 sqmm, and the solid angle within the f/2.8 illumination cone is Ω=0.0978 steradians. Thus $$E = 13.1 \text{ sqmm-ster}$$

This etendu point must be constant for all numerical aperture transformations occurring within the engine, therefor the maximum size of compander waveguide entrance face 31 allowed by the etendu point is $$A = E/\Omega.$$

At the f/1 collection stage defined by the elliptical reflector, Ω=0.6633 steradians, thus the maximum allowable area of entrance face 31 is A=19.7 sqmm. At 16:9 aspect ratio this corresponds to compander waveguide entrance face 31 diagonal size D1=6.89 mm. D2 is the diagonal size of the compander exit face as well as the diagonal size of the active device area. Thus, the ratio of diagonal sizes D1 and D2 is the magnification provided by the compander waveguide such that $$M = D2/D1$$

$$M = 17.7 \text{ mm}/6.89 \text{ mm} = 2.57 \text{ magnification}.$$

The diagonal size D1 of compander exit face 31, which has been computed to be D1=6.89 mm, is thus established as the maximum size of the entrance face aperture into which all collected and condensed light from the reflector must enter. To achieve maximum light throughput at the etendu point, the eccentricity of ellipsoidal reflector 21 is calculated specifically to maximize the amount of light falling incident onto compander entrance face 31 with diagonal size D1=6.89 mm. This is accomplished by computer raytrace methods well known in the trade. Computer simulation analysis specifies that the ideal ellipsoid eccentricity of reflector 31 for the specified reflector aperture of 75 mm using the specified lamp arc size of 1 mm×0.5 mm is Eccentricity=0.770.

By the fundamental concept of the architecture, the compander waveguide length L is of no consequence and can be set at any specified length, such as 12", to remote the collection stage of lamp, cold mirror and reflector assembly away from the projection axis.

Once the imaging stage numerical aperture or f/# is specified in the base parameters, f/2.8 in the case of the preferred embodiment, the complete sizes, material types and extents of all imaging stage components can be derived using raytrace and mechanical design techniques well known in the trade. These techniques compute that within the limits set by the etendu point, the minimum imaging stage path length from imager to projection lens in SF-1 glass type, is 45.5 mm. This is an inherently short path length in comparison to prior art systems of like class and assures the least complex projection lens for a given set of desired lens parameters. Likewise, the minimum dimensions of PBS cubes P1 and P2 are computed by this technique to be 20.0 mm×20.0 mm×28.0 mm, while the dimensions of output PBS cube P3 is computed by this technique to 25.4 mm×25.4 mm×28.0 mm. These are inherently small component sizes in comparison to prior art systems of like class and assures minimum cost.

Once the size of the imaging stage components are set, the size and numerical aperture of illumination stage condenser lens assemblage 26 can also be computed using raytrace techniques well known in the trade. Using the techniques, a suitable telecentric lens assemblage is found to be two identical aspheric condenser lenses of aperture size 45 mm placed 50 mm apart with numerical aperture corresponding to a combined lens speed specification of f/1. As is also well known in the trade, this is not necessarily the only lens condenser assemblage specification applicable to the preferred embodiment, as various combinations of lens size and f/# can also produce an ideal telecentric focus.

Referring again to FIG. 1, right angle turning prism 25 establishes a rotation axis about a point at the center 51 of its output face, which is essentially a rotation about imaging stage axis 54. Illumination stage axis 52 and collection stage axis 53 coupled together, along with all components situated thereon in fixed particular position, can be rotated about imaging stage axis 54 as required for superior fit and form factor within television or computer monitor cabinetry. While this "rotation joint" due exclusively to turning prism 25 is optional and not related to the basic functionality of the engine architecture, it does add design flexibility for placement of the engine 10 in enclosures. This is because any desired rotation angle of the coupled axes 52 and 53 in a plane perpendicular to imaging stage axis 54 can be accommodated by the architecture.

When illumination stage axis 52 and collection stage axis 53 are coupled and rotated about imaging stage axis 54, a corresponding second rotation or "spin" of illumination stage axis 52 components primary PBS 24 and compander 24 is necessary. This is because an illumination axis rotation to a specific arbitrary angle about rotation point 51 also rotates the borders of the rectangular compander exit face 32 to the same specific arbitrary angle relative to the borders of the rectangular imagers I1, I2 and I3. While the imagers are fixed in an upright in position, the rectangular compander face 32 illuminating them rotates to the specified arbitrary angle as a result of the original axis rotation about rotation point 51. This condition requires compensation for the rotation of the compander face 32 to square the illumination aperture attitude with the imager attitude. Likewise, the direction of the polarization axis set by primary PBS 24 is also affected by the arbitrary physical rotation of the illumination stage about center point 51. Compensation for this is accomplished by simply rotating or "spinning" these two components on illumination stage axis 52 about illumination stage axis 52. As stated, these components along illumination axis 52 requiring compensatory secondary rotation are the compander 23 and primary PBS cube 24. For example, if a forty-five degree rotation angle is specified at rotation point 51 about imaging stage axis 54, the compander 23 and primary PBS 24 must be spun about illumination stage axis 52 to an angle of −45°. This secondary compensatory rotation assures that the rectangular illumination falling incident on the imagers is again aligned with the rectangular imagers themselves.

Another capability of the presently preferred embodiment improving its further functionality as it relates to affable orientations of the engine components within desired cabinetry, is the axis angle and proximity location of the lamp collection stage. The components of collection stage 61 lying along collection stage axis 53, namely the lamp 20 and reflector 21, can be independently rotated to any desired angle about illumination stage axis 52 at collection stage rotation point 55 of cold mirror 22. Since the reflector 25 has a circular aperture, no compensatory secondary rotation is necessary. This rotation of collection stage axis 53 is independent of the illumination stage rotation explained above and can be specified to any angle without consequence.

The further functionality satisfied by the optical rotation joints as described above relate to the concerns and proximities of the thermally hot projection lamp 20 in UL (Underwriter's Lab) regulated consumer products. This invokes consequences beyond the concerns of the engine optical design that generally result in conflict with the optical design. A product for the living room or desktop must have efficient fan airflow, heat dissipation direction and user access to replace the lamp. These mandates generally dictate that the projection lamp reside in a location in the television or monitor cabinet which is not ideal with respect to the position of the projection axis and its relationship to cabinet folding mirrors or obstructions. The prior art discloses no remedy for this problem.

The proximity of the projection lamp to the engine's imaging stage components produces other further requirements related to the thermal effect of the lamp's ambient temperature and heat output on them. Moving the lamp's heat ambiance away from proximity to the imaging stage glass and imagers, essentially "remoting" it from the imaging stage, reduces or eliminates both short and long-term thermally induced stress in the optical glass and performance loss in the semiconductor imagers. Thermal stress produces stress-induced birefringence in the imaging stage glass, and in a polarization-sensitive device results in a reduction of image quality. The prior art discloses no remedy for this further functionality.

Reduced thermal stress is enabled in the disclosed architecture through a combination of the two optical rotation joints described above and the compander 23, which extends the illumination stage to remote the lamp and reflector away from the engine with no loss in performance. In the presently preferred embodiments, the dimensional length of compander 23 is completely independent of the optical design and can be embodied as long as desired. Compander 23 can be substantially lengthened to an appropriate dimension spanning the inside dimensions of a rear projection cabinet, say for example, nine inches to twenty-four inches long. The 'light pipe' action of the compander enables the designer to locate the lamp and its reflector away from close proximity to the projection engine with no adverse effects in the efficacy or efficiency of the engine. This property of the compander waveguide is ideally suited to situating the lamp at the lower rear or side of the cabinet without affecting the preferred position of the projector output axis.

Figure 8A:
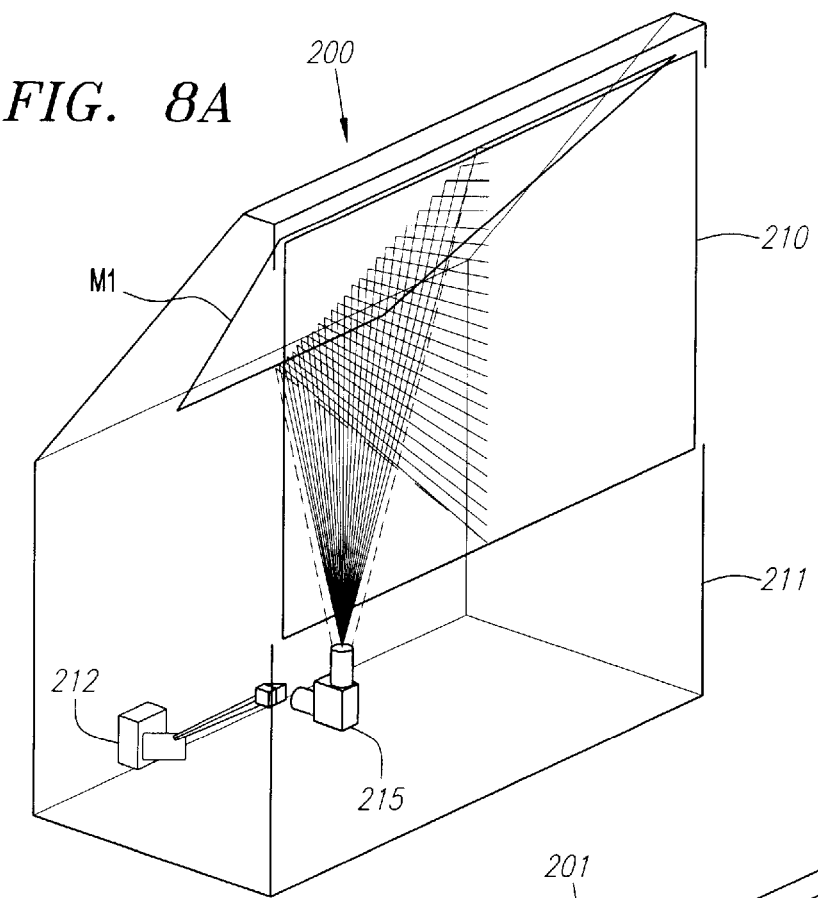
FIGS. 8a–8c are views of a rear projection television or computer monitor of the present invention utilizing the engine architecture of the present invention.
Figure 8B:
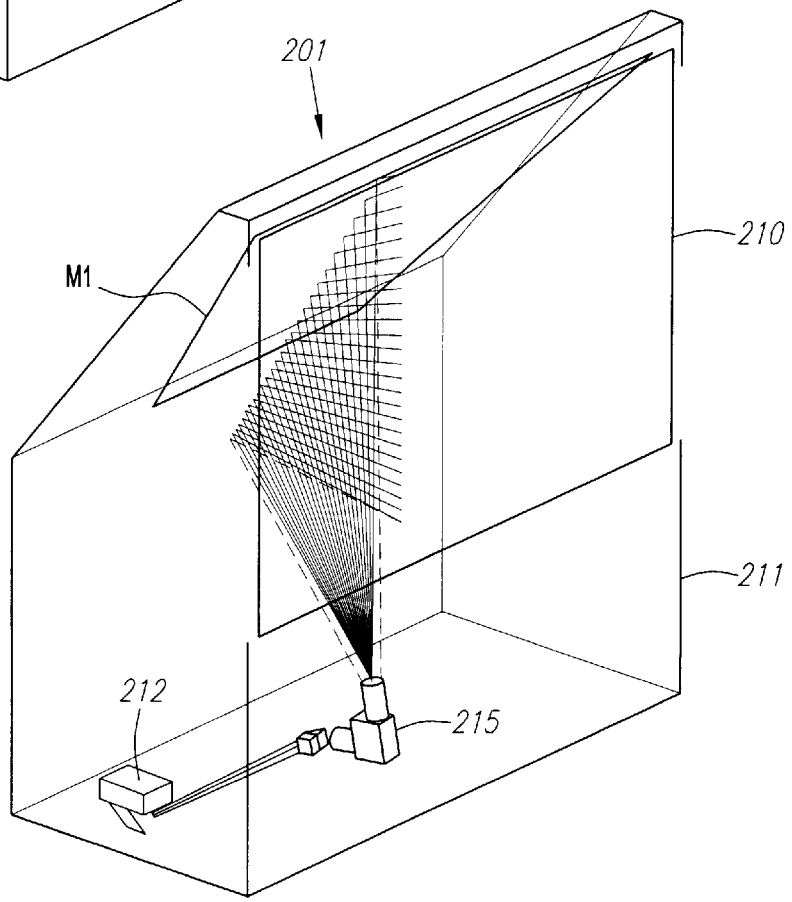
Figure 8C:
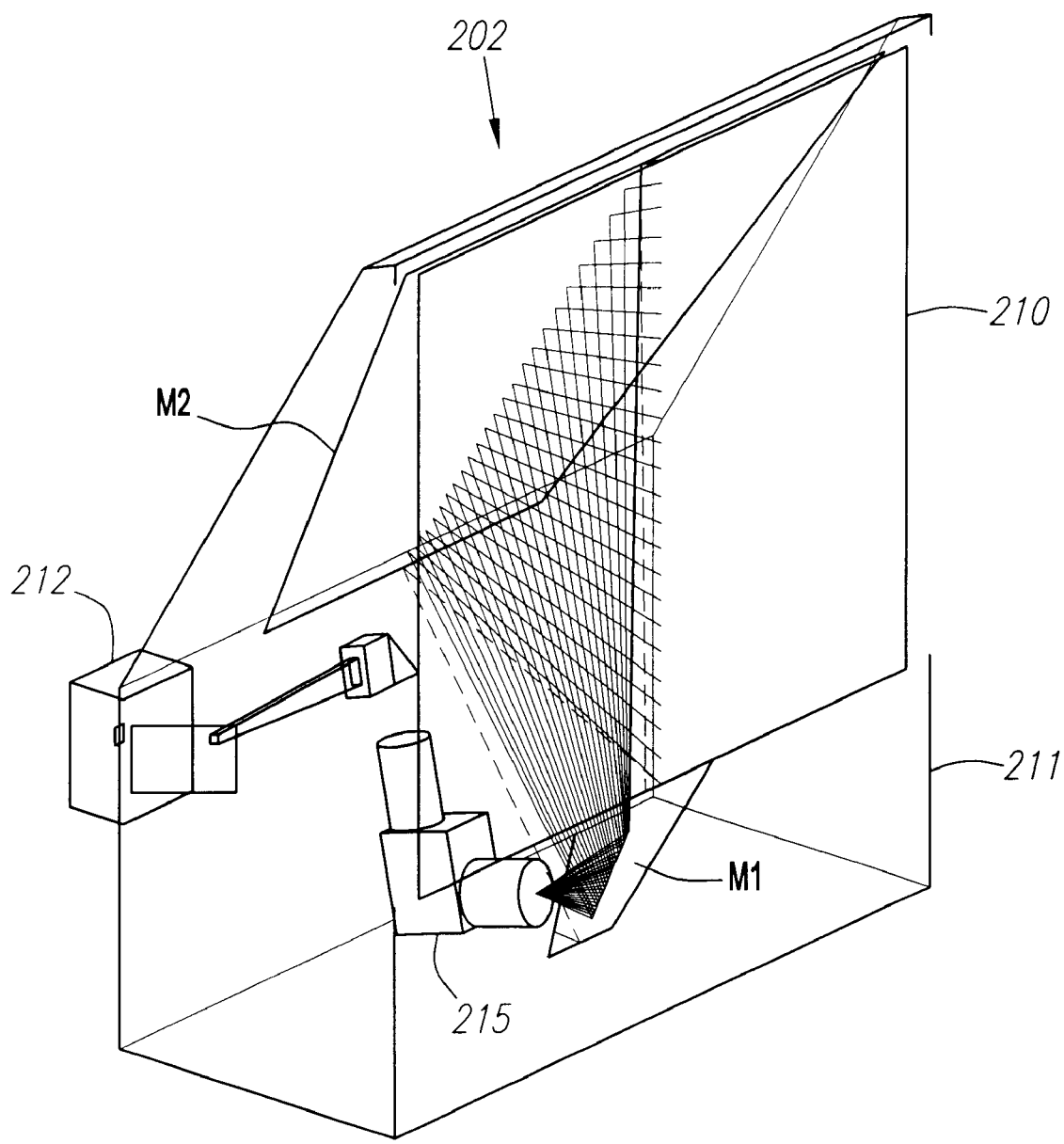

Presently preferred embodiments of television and computer monitors of the present invention are depicted in FIGS. 8a, 8b and 8c. FIGS. 8a and 8b show common single-mirror rear projection television systems 200 and 201 respectively, along with folding mirror M1. FIG. 8c shows a two-mirror desktop projection monitor 202, along with two folding mirrors M1 and M2. Each figure depicts cabinet 211, rear projection screen 210, disclosed engine embodiment 215, and lamp/reflector module 212. In FIG. 8a a rear projection television 200 is shown with lamp/reflector module 212 remoted to the lower rear corner of the cabinet. In FIG. 8b, a rear projection television 201 is shown with lamp/reflector module 212 remoted to the lower front side of the cabinet. Unique to FIG. 8c is rear projection monitor 202 with lamp/reflector module 212 remoted to the upper rear corner of the cabinet. Using the two optical rotation joints 51 and 55 (see FIG. 1) along with extended length compander 23, virtually any combination for remote lamp/reflector module 212 can be accommodated without consequence to projector engine basic performance, meeting fit and form factors, as well as safety and heat control requirements.

The present invention is of course not limited to the illustrated component arrangements, specifications or configurations shown in the figures, but extends to all configurations of components, elements and values utilizing the architecture construction geometry disclosed herein.

Thus, a preferred image projector engine architecture and a preferred rear projection television/computer monitor has been described. While embodiments and applications of this invention have been shown and described, as would be apparent to those skilled in the art, many more embodiments and applications are possible without departing from the inventive concepts disclosed herein. The invention, therefore, is not to be restricted except in the spirit of the appended claims.

I claim:

1. An image projection engine apparatus comprising:
    a light source;
    a reflector that collects and condenses light emitted by said light source into a first focus of light;
    a mirror that redirects said first focus of light;
    a compander positioned to receive said first focus of light, said compander comprising an elongate member having an entrance face and an exit face oppositely opposed from said entrance face, said entrance face comprising a quadrilateral having a fixed aspect ratio, said entrance face having a first surface area, said exit face comprising a quadrilateral having said fixed aspect ratio and a second surface area, said second surface area being greater than said first surface area, said compander outputting a telecentric light beam,
    a first polarizing beamsplitter cube for receipt of said telecentric light beam, said first polarizing beamsplitter cube oriented such that it outputs a telecentric light beam having a first polarization;
    a condenser that receives said telecentric light beam having said first polarization state from said first polarizing beamsplitter cube and focuses said telecentric light beam along a first optical axis;
    a dichroic mirror disposed at a substantially forty-five degree angle with respect to said first optical axis, said first dichroic mirror adapted to split said light beam into a green light beam substantially along a second optical axis and a magenta light beam substantially along said first optical axis, said magenta beam having a red component and a blue component;
    a prism assembly, said prism assembly comprising:
        a first dichroic trimming mirror positioned substantially perpendicular to said second optical axis;
        a second polarization beamsplitter cube, said second polarization beam splitter cube comprising a first beam splitting hypotenuse which reflects first polarization green light along a third optical axis and transmits second polarization green light along said second optical axis;
        a first reflective liquid-crystal-on-silicon semiconductor light valve imaging device affixed to said second polarization beamsplitter cube and being substantially perpendicular to said third optical axis, said first reflective liquid-crystal-on-silicon semiconductor light valve imaging device reflecting green light towards said first beam splitting hypotenuse along said third optical axis, said first beam splitting hypotenuse reflecting first polarization green light along said second optical axis and transmitting second polarization green light along said third optical axis;
        a first half-wave retarder affixed to said second polarization beamsplitter cube and being substantially perpendicular to the third optical axis;
        a second dichroic trimming mirror arranged substantially perpendicularly to said first optical axis;
        a second half-wave retarder affixed to said second dichroic trimming mirror, said second half-wave retarder being substantially perpendicular to said first optical axis, said second half-wave retarder switching first polarization red light to said second polarization;
        a third polarization beamsplitter cube, said third polarization beam splitter cube comprising a second beam splitting hypotenuse which reflects first polarization light along a fourth optical axis and transmits second polarization light along said first optical axis;
        a second reflective liquid-crystal-on-silicon semiconductor light valve imaging device affixed to said third polarization beamsplitter cube and being substantially perpendicular to said first optical axis, said second reflective liquid-crystal-on-silicon semiconductor light valve imaging device reflecting red light towards said second beam splitting hypotenuse along said first optical axis, said second beam splitting hypotenuse reflecting first polarization red light along said fourth optical axis and transmitting second polarization red light along said first optical axis;
        a third reflective liquid-crystal-on-silicon semiconductor light valve imaging device affixed to said third polarization beamsplitter cube and being substantially perpendicular to said fourth optical axis, said third reflective liquid-crystal-on-silicon semiconductor light valve imaging device reflecting blue light back towards said second beam splitting hypotenuse along said fourth optical axis, said second beam splitting hypotenuse reflecting first polarization blue light along said first optical axis and transmitting second polarization blue light along said fourth optical axis;

a third half-wave retarder affixed to said third polarization beamsplitter cube that is substantially perpendicular to said fourth optical axis, said third half-wave retarder switching said first polarization red light to said second polarization;

said first reflective liquid-crystal-on-silicon semiconductor light valve imaging device, said second reflective liquid-crystal-on-silicon semiconductor light valve imaging device and said third reflective liquid-crystal-on-silicon semiconductor light valve imaging device each comprising an active imaging area having substantially said fixed aspect ratio and substantially said second surface area; and a fourth polarization beamsplitter cube affixed to said first half-wave retarder and said third half-wave retarder such that said third optical axis is substantially perpendicular to said fourth optical axis, said fourth polarization beam splitter cube comprising a third beam splitting hypotenuse which reflects first polarization light along said third optical axis and transmits second polarization light along said fourth optical axis.

2. The image projection engine apparatus of claim 1 wherein light beams having said first polarization are in an S-polarization state.

3. The image projection engine apparatus of claim 1 wherein light beams having said second polarization are in a P-polarization state.

4. The image projection engine apparatus of claim 1 wherein said first half-wave retarder comprises wide-band half-wave retarder.

5. The image projection engine apparatus of claim 1 wherein said first dichroic trimming mirror comprises a green transmission dichroic mirror.

6. The image projection engine apparatus of claim 1 wherein said second half-wave retarder and said third half-wave retarder each comprise a narrow-band half-wave retarder.

7. The image projection engine apparatus of claim 1 wherein said first aspect ratio and said second aspect ratio are the same.

8. The image projection engine apparatus of claim 1 further comprising a turning prism inserted between said first polarizing beamsplitter cube and said condenser, said turning prism turning light output from said first polarizing beamsplitter cube to be incident upon said condenser.

9. The image projection engine apparatus of claim 1 wherein said condenser comprises a single lens.

10. The image projection engine apparatus of claim 1 wherein said condenser comprises a plurality of lenses.

11. The image projection apparatus of claim 1 further comprising a projection lens aligned along said fourth optical axis.

12. A method for creating an image in a projected image device comprising:

providing a first polarization telecentric white light beam;

splitting said first polarization telecentric white light beam into a first polarization telecentric green light beam and a first polarization telecentric magenta light beam, said first polarization telecentric magenta light beam having a first polarization red component and a first polarization blue component;

directing said first polarization telecentric green light beam onto a first liquid-crystal-on-silicon semiconductor light valve imaging device such that said first liquid-crystal-on-silicon semiconductor light valve imaging device reflects a second polarization green light beam containing pixel data;

switching said second polarization green light beam containing pixel data into a first polarization green light beam containing pixel data;

directing said first polarization green light beam containing pixel data along an output axis while directing substantially all green waste polarization light along an axis separate from said output axis;

switching said first polarization red component of said first polarization telecentric magenta light beam into a second polarization red light beam;

directing said second polarization red light beam onto a second liquid-crystal-on-silicon semiconductor light valve imaging device such that said second liquid-crystal-on-silicon semiconductor light valve imaging device reflects a first polarization red light beam containing pixel data;

directing said first polarization red light beam containing pixel data along an output axis while directing substantially all red waste polarization light along an axis separate from said output axis;

switching said first polarization red light beam containing pixel data into a second polarization red light beam containing pixel data;

directing said first polarization blue component onto a third liquid-crystal-on-silicon semiconductor light valve imaging device such that said third liquid-crystal-on-silicon semiconductor light valve imaging device reflects a second polarization blue light beam containing pixel data; and directing said second polarization blue light beam containing pixel data along an output axis while directing substantially all blue waste polarization light along an axis separate from said output axis.

13. The method of claim 12 wherein said first polarization is S-polarization.

14. The method of claim 12 wherein said second polarization is P-polarization.

15. A television set comprising:

a screen for receipt of optical data forming a picture, said positioned in a cabinet such that said screen is substantially perpendicular to an installation surface;

image projection engine apparatus disposed within said cabinet, said image projection apparatus comprising:

a light collection stage;

an illumination stage comprising a compander, said compander extending away from said light collection stage and having an exit face oppositely opposed from an entrance face, said entrance face and said exit face having a quadrilateral shape, said entrance face having a first aspect ratio, said exit face having a second aspect ratio, said compander outputting a focus of light to a turning prism which directs said focus of light to a first polarizing beamsplitter ("PBS") cube, said first PBS cube outputting a white light beam having a first polarization state to a condenser that focuses said white light beam along a first optical axis;

an imaging stage comprising a first dichroic mirror disposed at a substantially forty-five degree angle with respect to said first optical axis, a said first dichroic mirror reflecting a first polarization green light beam substantially along a second optical axis and transmitting a first polarization magenta light beam substantially along said first optical axis;

said imaging stage further comprising a second PBS cube, a third PBS cube and a fourth PBS cube, said second PBS cube having a dichroic trimming mirror affixed to a first face thereto that is disposed substantially perpendicular to said second optical axis, a second face of said first polarization beamsplitter cube having a first imaging device affixed thereto, said first face and said second face of said second PBS cube being adjacent and substantially ninety degrees apart, said second PBS cube having a third face with a first half-wave retarder affixed thereto, said third face of said second PBS cube being oppositely opposed said second face of said second PBS cube, said second PBS cube having a fourth face, said fourth face of said second PBS cube comprising a first waste light dump port;

said third PBS cube having a second half-wave retarder affixed to a first face thereof, said second half-wave retarder having a second dichroic mirror affixed thereto, said first face of said third PBS cube, said second half-wave retarder and said second dichroic mirror being substantially perpendicular to said first optical axis, said third PBS cube having a second imaging device affixed to a second face thereof, said second face of said third PBS cube being oppositely opposed from said first face of said third PBS cube, said third PBS cube having a third imaging device affixed to a third face thereof, said third face of said third PBS cube being adjacent to and substantially perpendicular to said first face and said second face of said third PBS cube, said third PBS cube having a third half-wave retarder affixed to a fourth face thereof, said fourth face being oppositely opposed from said third face of said third PBS cube;

said fourth PBS cube being affixed to said first half-wave retarder at a first face thereof, said fourth PBS cube being affixed to said third half-wave retarder at a second face thereof, said first face and said second face of said fourth PBS cube being adjacent and substantially perpendicular to one another, said fourth PBS cube having a third face, said third face being adjacent and substantially perpendicular to said second face, said third face comprising a second waste light dump port; and a lens assembly for focusing optical data output from said imaging stage onto said screen.

16. An imaging apparatus for use in an electronic image projector engine comprising:

a first dichroic mirror disposed at a substantially forty-five degree angle with respect to a first optical axis, said first dichroic mirror being characterized by its ability to split a pre-polarized white light beam into a green light beam along a second optical axis and a magenta light beam along said first optical axis, said magenta beam having a red component and a blue component;

a first polarization beamsplitter ("PBS") cube comprising a first beam splitting hypotenuse which reflects first polarization green light along a third optical axis and transmits second polarization green light along said second optical axis, thereby forming a first waste light dump port;

a first imaging device affixed to said first PBS cube and being substantially perpendicular to said third optical axis, said first imaging device reflecting green light towards said first beam splitting hypotenuse along said third optical axis;

a first half-wave retarder affixed to said first PBS cube such that it is substantially perpendicular to the third optical axis;

a second dichroic mirror arranged substantially perpendicularly to said first optical axis;

a second half-wave retarder affixed to said second dichroic mirror, said second half-wave retarder being substantially perpendicular to said first optical axis, said second half-wave retarder switching said red component from said first polarization to said second polarization;

a second PBS cube comprising a second beam splitting hypotenuse which reflects first polarization light along a fourth optical axis and transmits second polarization light along said second optical axis;

a second imaging device affixed to said second PBS cube and being substantially perpendicular to said first optical axis, said second imaging device reflecting red light towards said second beam splitting hypotenuse along said first optical axis such that said second beam splitting hypotenuse reflects first polarization red light along said fourth optical axis and transmits second polarization red light along said first optical axis;

a third imaging device affixed to said second PBS cube and being substantially perpendicular to said fourth optical axis, said third imaging device reflecting second polarization blue light towards said second beam splitting hypotenuse along said fourth optical axis such that said second beam splitting hypotenuse reflects first polarization blue light along said first optical axis and transmits second polarization blue light along said fourth optical axis;

a third half-wave retarder affixed to said second PBS cube and being substantially perpendicular to said fourth optical axis, said third half-wave retarder switching first polarization red light to second polarization red light; and a third PBS cube affixed to said first half-wave retarder and said third half-wave retarder such that said third optical axis is substantially perpendicular to said fourth optical axis, said third PBS cube comprising a third beam splitting hypotenuse which reflects first polarization light and transmits second polarization light, said third PBS cube also comprising a second waste light dump port, said second waste light dump port being substantially parallel to said first half-wave retarder.

17. A rear projection television comprising a screen mounted in a cabinet for displaying optical data;

a light source;

a reflector that collects and condenses light emitted by said light source into a first focus of light;

a mirror that redirects said first focus of light;

a compander positioned to receive said first focus of light, said compander comprising an elongate member having an entrance face and an exit face oppositely opposed from said entrance face, said entrance face comprising a quadrilateral having an aspect ratio and a first diagonal dimension, said exit face comprising a quadrilateral having said aspect ratio and a second diagonal dimension, said compander outputting a second focus of light, a first polarizing beamsplitter cube for receipt of said second focus of light, said first polarizing beamsplitter cube oriented such that it outputs a light beam having a first polarization;

a condenser that receives said light beam having said first polarization state from said beamsplitter cube and focuses said light beam along a first optical axis;

a first dichroic mirror disposed at a substantially forty-five degree angle with respect to said first optical axis, said first dichroic mirror adapted to split said light beam into a green light beam substantially along a second optical axis and a magenta light beam substantially along said first optical axis, said magenta beam having a red component and a blue component;

a prism assembly, said prism assembly comprising:
- a dichroic trimming mirror positioned substantially perpendicular to said second optical axis;
- a second polarization beamsplitter cube, said second polarization beam splitter cube comprising a first beam splitting hypotenuse which reflects first polarization green light along a third optical axis and transmits second polarization green light along said second optical axis;
- a first imaging device affixed to said second polarization beamsplitter cube and being substantially perpendicular to said third optical axis, said first imaging device reflecting green light towards said first beam splitting hypotenuse along said third optical axis, said first beam splitting hypotenuse reflecting first polarization green light along said second optical axis and transmitting second polarization green light along said third optical axis;
- a first half-wave retarder affixed to said second polarization beamsplitter cube and being substantially perpendicular to the third optical axis;
- a second dichroic mirror arranged substantially perpendicularly to said first optical axis;
- a second half-wave retarder affixed to said second dichroic mirror, said second half-wave retarder being substantially perpendicular to said first optical axis, said second half-wave retarder switching first polarization red light to said second polarization;
- a third polarization beamsplitter cube, said third polarization beam splitter cube comprising a second beam splitting hypotenuse which reflects first polarization light along a fourth optical axis and transmits second polarization light along said second optical axis;
- a second imaging device affixed to said third polarization beamsplitter cube and being substantially perpendicular to said first optical axis, said second imaging device reflecting red light towards said second beam splitting hypotenuse along said first optical axis, said second beam splitting hypotenuse reflecting first polarization red light along said fourth optical axis and transmitting second polarization red light along said first optical axis;
- a third imaging device affixed to said third polarization beamsplitter cube and being substantially perpendicular to said fourth optical axis, said third imaging device reflecting blue light back towards said second beam splitting hypotenuse along said fourth optical axis, said second beam splitting hypotenuse reflecting first polarization blue light along said first optical axis and transmitting second polarization blue light along said fourth optical axis;
- said first imaging device, said second imaging device and said third imaging device each comprising an active imaging area having substantially said aspect ratio and substantially said second diagonal dimension;
- a third half-wave retarder affixed to said third polarization beamsplitter cube that is substantially perpendicular to said fourth optical axis, said third half-wave retarder switching said first polarization red light to said second polarization;
- a fourth polarization beamsplitter cube affixed to said first half-wave retarder and said third half-wave retarder such that said third optical axis is substantially perpendicular to said fourth optical axis, said fourth polarization beam splitter cube comprising a third beam splitting hypotenuse which reflects first polarization light along said third optical axis and transmits second polarization light along said fourth optical axis; and
- a lens for focusing light beams emerging from said fourth polarization beamsplitter cube onto said screen.

18. An image projection engine apparatus comprising:

a light source;

a reflector that collects and condenses light emitted by said light source into a first focus of light;

a mirror that redirects said first focus of light;

a compander positioned to receive said first focus of light, said compander comprising an elongate member having an entrance face and an exit face oppositely opposed from said entrance face, said entrance face comprising a quadrilateral having an aspect ratio and a first surface area, said exit face comprising a quadrilateral having said aspect ratio and a second surface area, said second surface area being greater than said first surface area, said compander outputting a second focus of light, a first polarizing beamsplitter ("PBS") cube for receipt of said second focus of light, said first PBS cube oriented such that it outputs a light beam having a first polarization;

a condenser that receives said light beam having said first polarization state from said first PBS cube and focuses said light beam on a first dichroic mirror, said first dichroic mirror disposed at a substantially forty-five degree angle with respect to said condenser, said first dichroic mirror adapted to split said light beam into a magenta light beam substantially along a first optical axis and a green light beam substantially along a second optical axis;

a prism assembly, said prism assembly comprising:
- a dichroic trimming mirror positioned substantially perpendicular to said second optical axis;
- a second PBS cube, said second PBS cube comprising a first beam splitting hypotenuse which reflects first polarization light along a third optical axis and transmits second polarization green light along said second optical axis, said second PBS cube further comprising a first waste light exit port substantially perpendicular to said second optical axis;
- a first imaging device affixed to said second PBS cube and being substantially perpendicular to said third optical axis, said first imaging device reflecting light towards said first beam splitting hypotenuse along said third optical axis;
- a first half-wave retarder affixed to said second PBS cube and being substantially perpendicular to the third optical axis;
- a second dichroic mirror arranged substantially perpendicularly to said first optical axis;
- a second half-wave retarder affixed to said second dichroic mirror, said second half-wave retarder being substantially perpendicular to said first optical axis, said second half-wave retarder switching first polarization red light to said second polarization;

a third PBS cube comprising a second beam splitting hypotenuse which reflects first polarization light along a fourth optical axis and transmits second polarization light along said first optical axis;

a second imaging device affixed to said third PBS cube and being substantially perpendicular to said first optical axis, said second imaging device reflecting red light towards said second beam splitting hypotenuse along said first optical axis, said second beam splitting hypotenuse reflecting first polarization red light along said fourth optical axis and transmitting second polarization red light along said first optical axis;

a third imaging device affixed to said third polarization beamsplitter cube and being substantially perpendicular to said fourth optical axis, said third imaging device reflecting blue light back towards said second beam splitting hypotenuse along said fourth optical axis, said second beam splitting hypotenuse reflecting first polarization blue light along said first optical axis and transmitting second polarization blue light along said fourth optical axis;

a third half-wave retarder affixed to said third PBS cube that is substantially perpendicular to said fourth optical axis, said third half-wave retarder switching said first polarization red light to said second polarization;

said first imaging device, said second imaging device and said third imaging device each comprising an active imaging area having substantially said fixed aspect ratio and substantially said second surface area; and a fourth PBS cube affixed to said first half-wave retarder and said third half-wave retarder such that said third optical axis is substantially perpendicular to said fourth optical axis, said fourth PBS cube comprising a third beam splitting hypotenuse which reflects first polarization light along said third optical axis and transmits second polarization light along said fourth optical axis.

19. A compander for use in an electronic image projector engine, the projector engine utilizing reflective imaging devices having an active imaging area comprising a specified aspect ratio and a specified diagonal dimension, the compander adapted to receive a light beam having an illumination structure, said compander smoothing said illumination structure, de-circularizing said light beam, setting engine etendu point, transforming numerical aperture of said light beam to a predetermined numerical aperture, magnifying the light beam aperture to create a light beam having said specified aspect ratio and said specified surface area, and rendering said light beam telecentric, said compander comprising:

an elongate member comprised of an optical material, said elongate member having an entrance face and an exit face, said exit face oppositely opposed from said entrance face;

said entrance face having a quadrilateral shape with substantially said specified aspect ratio and a first diagonal dimension; and said exit face having a quadrilateral shape having substantially said specified aspect ratio, said exit face having substantially said specified diagonal dimension, said specified diagonal dimension being greater than said first diagonal dimension.

20. The compander of claim 19 wherein said optical material is glass.

21. The compander of claim 19 wherein said optical material is plastic.

22. The compander of claim 19 wherein said compander is an integral, one piece structure.

23. A compander for use in an electronic image projector engine, the projector engine utilizing reflective imaging devices having an active imaging area comprising a specified aspect ratio and specified surface area, the compander adapted to receive a light beam having an illumination structure, said compander smoothing said illumination structure, decircularizing said light beam, setting engine etendu point, transforming numerical aperture of said light beam to a predetermined numerical aperture, magnifying the light beam aperture to create a light beam having said specified aspect ratio and said specified surface area, and rendering said light beam telecentric, said compander comprising:

an elongate member comprised of an optical material, said elongate member having an entrance face and an exit face, said exit face oppositely opposed from said entrance face;

said entrance face having a quadrilateral shape with substantially said specified aspect ratio and a first surface area;

said exit face having a quadrilateral shape with substantially said specified aspect ratio and a second surface area, said second surface area being greater than said first surface area, said second surface area being substantially identical to said specified surface area.

24. The compander of claim 23 wherein said optical material is glass.

25. The compander of claim 23 wherein said optical material is plastic.

26. The compander of claim 23 wherein said compander is an integral, one piece structure.

* * * * *